(12) United States Patent
Dogu et al.

(10) Patent No.: US 10,032,027 B2
(45) Date of Patent: Jul. 24, 2018

(54) INFORMATION PROCESSING APPARATUS AND PROGRAM FOR EXECUTING AN ELECTRONIC DATA IN AN EXECUTION ENVIRONMENT

(71) Applicant: DIGITAL ARTS INC., Tokyo (JP)

(72) Inventors: Toshio Dogu, Tokyo (JP); Noriyuki Takahashi, Tokyo (JP); Shigeki Kimura, Tokyo (JP)

(73) Assignee: DIGITAL ARTS INC., Tokyo (JP)

( * ) Notice: Subject to any disclaimer, the term of this patent is extended or adjusted under 35 U.S.C. 154(b) by 0 days.

(21) Appl. No.: 14/810,452

(22) Filed: Jul. 27, 2015

(65) Prior Publication Data

US 2016/0036840 A1    Feb. 4, 2016

Related U.S. Application Data

(63) Continuation-in-part of application No. 14/446,296, filed on Jul. 29, 2014.

(30) Foreign Application Priority Data

Oct. 14, 2014   (JP) .................................. 2014-210314

(51) Int. Cl.
*G06F 21/56*   (2013.01)
*H04L 29/06*   (2006.01)
(Continued)

(52) U.S. Cl.
CPC ............ *G06F 21/567* (2013.01); *G06F 21/56* (2013.01); *G06F 21/566* (2013.01);
(Continued)

(58) Field of Classification Search
CPC ......... H04L 67/02; H04L 67/06; H04L 67/10; H04L 63/145; H04L 63/1416;
(Continued)

(56) References Cited

U.S. PATENT DOCUMENTS 5,832,208 A *  11/1998  Chen ..................... G06F 21/566
                                                   709/206
6,457,042 B1 *  9/2002  Czaykowski ......... G06F 9/5044
                                                   709/201
(Continued)

FOREIGN PATENT DOCUMENTS

JP   2002-328874 A   11/2002
JP   2002-366487 A   12/2002
(Continued)

OTHER PUBLICATIONS

"Monitoring an exit and blocking, there is a need to increase watchful eyes," Nikkei Communications, Dec. 2011, No. 575, pp. 20-29.

(Continued)

*Primary Examiner* — Ramy M Osman

(57) ABSTRACT

It is difficult to prevent virus infection, information leakage or the like for example when a user carelessly manipulates a file. An electronic file manipulating section that obtains an instruction about manipulation of an electronic file; a remote manipulation section that establishes a communication path enabling remote manipulation with an execution environment in which manipulation of the electronic file is to be executed, and transmits an execution instruction to instruct the execution environment to execute manipulation of the electronic file thereon to the execution environment via the communication path enabling remote manipulation; and an electronic file transmitting section that transmits the electronic file to the execution environment in response to the instruction are included.

6 Claims, 19 Drawing Sheets

(51) Int. Cl.
*H04L 29/08* (2006.01)
*H04L 12/58* (2006.01)

(52) U.S. Cl.
CPC ............ *H04L 51/066* (2013.01); *H04L 51/08* (2013.01); *H04L 63/145* (2013.01); *H04L 63/1416* (2013.01); *H04L 67/06* (2013.01); *H04L 67/10* (2013.01)

(58) Field of Classification Search
CPC ......... H04L 51/08; G06F 21/51; G06F 21/53; G06F 21/56; G06F 21/566; G06F 21/567
See application file for complete search history.

(56) References Cited

U.S. PATENT DOCUMENTS

| | | | |
|---|---|---|---|
| 6,594,686 B1* | 7/2003 | Edwards | H04L 63/145 709/203 |
| 6,901,519 B1* | 5/2005 | Stewart | G06F 21/56 709/206 |
| 7,484,244 B2* | 1/2009 | Nagoya | G06F 21/567 713/152 |
| 7,913,078 B1* | 3/2011 | Stewart | G06F 21/567 713/150 |
| 8,326,936 B2* | 12/2012 | Marino | G06F 21/56 709/206 |
| 8,505,101 B1* | 8/2013 | Lee | G06F 21/564 726/22 |
| 9,141,431 B1* | 9/2015 | Godunov | G06F 9/5011 |
| 9,264,460 B2* | 2/2016 | Kawabata | H04L 67/141 |
| 9,367,635 B1* | 6/2016 | Warshenbrot | G06F 21/566 |
| 9,411,902 B2* | 8/2016 | Rajabi | G06F 21/51 |
| 2001/0005889 A1* | 6/2001 | Albrecht | H04L 63/145 726/24 |
| 2001/0054073 A1* | 12/2001 | Ruppert | H04L 51/08 709/206 |
| 2002/0129277 A1* | 9/2002 | Caccavale | G06F 21/562 726/24 |
| 2003/0105975 A1* | 6/2003 | Nagoya | H04L 63/145 726/24 |
| 2003/0139931 A1* | 7/2003 | Park | G06F 3/165 704/275 |
| 2003/0160813 A1* | 8/2003 | Raju | G06Q 10/10 715/730 |
| 2003/0195932 A1* | 10/2003 | Tanabe | H04L 63/08 709/205 |
| 2004/0254987 A1* | 12/2004 | Konsella | H04L 51/34 709/206 |
| 2005/0005160 A1* | 1/2005 | Bates | H04L 63/145 726/24 |
| 2005/0138116 A1* | 6/2005 | Bjare | G06F 9/5055 709/203 |
| 2006/0021029 A1 | 1/2006 | Brickell et al. | |
| 2006/0184632 A1* | 8/2006 | Marino | G06F 21/56 709/206 |
| 2006/0190606 A1 | 8/2006 | Kohavi | |
| 2007/0233818 A1* | 10/2007 | Kurumai | G06F 17/30893 709/219 |
| 2007/0245021 A1* | 10/2007 | Ohtsuka | G06F 17/30905 709/225 |
| 2008/0134272 A1* | 6/2008 | Yasuma | H04N 7/17318 725/119 |
| 2008/0222728 A1* | 9/2008 | Chavez | H04L 51/08 726/24 |
| 2010/0174992 A1* | 7/2010 | Portman | G06F 9/4443 715/738 |
| 2010/0192224 A1 | 7/2010 | Ferri et al. | |
| 2011/0066681 A1* | 3/2011 | Shiota | G06F 9/445 709/203 |
| 2011/0154431 A1* | 6/2011 | Walsh | G06F 21/53 726/1 |
| 2013/0055238 A1* | 2/2013 | Lee | G06F 21/56 717/178 |
| 2013/0347064 A1* | 12/2013 | Aissi | G06F 21/53 726/2 |
| 2014/0059229 A1* | 2/2014 | Parikh | H04L 47/70 709/226 |
| 2014/0165203 A1* | 6/2014 | Friedrichs | G06F 21/56 726/24 |
| 2015/0032793 A1* | 1/2015 | Dogu | H04L 63/145 709/201 |
| 2016/0036840 A1* | 2/2016 | Dogu | H04L 63/145 726/24 |

FOREIGN PATENT DOCUMENTS

| | | |
|---|---|---|
| JP | 2004-038273 A | 2/2004 |
| JP | 2004-133503 A | 4/2004 |
| JP | 2005-038361 A | 2/2005 |
| JP | 2005-157598 A | 6/2005 |
| JP | 2005-352823 A | 12/2005 |
| JP | 2007-299110 A | 11/2007 |
| JP | 2008-191731 A | 8/2008 |
| JP | 2011-034349 A | 2/2011 |
| JP | 2014-041404 A | 3/2014 |

OTHER PUBLICATIONS

Hideo Kobayashi, "UTM (Integrated Threat Management) Appliance, Evolution depending on a terminal/application utility form," telecommunication, Dec. 2012.

Katsunari Yoshioka, et al. "Vulnerability of Malware Sandbox. Analysis as an Online Service." CSS2009 Collection, Oct. 2009, pp. 523-528, Information Processing Society Symposium Series, vol. 2009, No. 11.

Extended European Search Report for European Patent Application No. 15 850 140.3, issued by the European Patent Office dated Jul. 27, 2017.

Office Action issued for counterpart Japanese Application 2014-210314, issued by the Japan Patent Office dated Aug. 1, 2017.

International Preliminary Report on Patentability for International Application No. PCT/JP2015/071393, issued by the International Bureau of WIPO dated Apr. 27, 2017.

Office Action issued for counterpart Japanese Application 2014-210314, issued by Japan Patent Office dated Mar. 7, 2017.

Office Action issued for related U.S. Appl. No. 14/446,296, issued by United States Patent and Trademark Office dated Mar. 2, 2017.

* cited by examiner

INFORMATION PROCESSING APPARATUS AND PROGRAM FOR EXECUTING AN ELECTRONIC DATA IN AN EXECUTION ENVIRONMENT

The contents of the following U.S. patent application are incorporated herein by reference: U.S. application Ser. No. 14/446,296 filed on Jul. 29, 2014.

The contents of the following Japanese patent application are incorporated herein by reference: Japanese Application No. 2014-210314 filed on Oct. 14, 2014.

BACKGROUND

1. Technical Field

The present invention relates to an information processing apparatus and a program.

2. Related Art

A known virus inspection system is configured to, in response to receiving an e-mail containing a suspicious attached file, forward the e-mail to a virus inspection computer. See, for example, Patent Documents 1 to 9.

Patent Document 1: Japanese Patent Application Publication No. 2002-328874
Patent Document 2: Japanese Patent Application Publication No. 2002-366487
Patent Document 3: Japanese Patent Application Publication No. 2003-169096
Patent Document 4: Japanese Patent Application Publication No. 2004-038273
Patent Document 5: Japanese Patent Application Publication No. 2004-133503
Patent Document 6: Japanese Patent Application Publication No. 2005-038361
Patent Document 7: Japanese Patent Application Publication No. 2005-157598
Patent Document 8: Japanese Patent Application Publication No. 2005-352823
Patent Document 9: Japanese Patent Application Publication No. 2007-299110

According to a conventional system, it is difficult to prevent virus infection, information leakage or the like for example when a user carelessly manipulates a file or view a web site.

SUMMARY

A first aspect of the present invention provides an information processing apparatus comprising:
an electronic file manipulating section that obtains an instruction about manipulation of an electronic file;
a remote manipulation section that establishes a communication path enabling remote manipulation with an execution environment in which manipulation of the electronic file is to be executed, and transmits an execution instruction to instruct the execution environment to execute manipulation of the electronic file thereon to the execution environment via the communication path enabling remote manipulation; and
an electronic file transmitting section that transmits the electronic file to the execution environment in response to the instruction.

The information processing apparatus may further comprise:
an execution environment determining section that determines an execution environment in which the electronic file is to be executed by the remote manipulation, based on a format, an extension or a name of the electronic file.

The information processing apparatus may further comprise:
an electronic file storing section that stores thereon the electronic file; and
an electronic file storing control section that controls whether to store the remotely manipulated electronic file onto the electronic file storing section.

A second aspect of the present invention provides an information processing apparatus comprising:
an electronic data identification information obtaining section that obtains electronic data identification information identifying electronic data in response to a user's instruction;
an execution environment determining section that determines an execution environment in which the electronic data is to be executed; and
a remote manipulation program generating section that generates a remote manipulation program to remotely manipulate the execution environment determined by the execution environment determining section. The remote manipulation program may cause a computer to perform a procedure for establishing a first communication path enabling remote manipulation between the computer and the execution environment determined by the execution environment determining section. The execution environment determined by the execution environment determining section may exchange information with a computer different from the computer via a second communication path. The second communication path may be a communication path different from the first communication path. The electronic data may be stored on the different computer.

In the information processing apparatus, the remote manipulation program may cause the computer to further perform a procedure for establishing a second communication path between the execution environment and the different computer. In the information processing apparatus, when the electronic data identification information obtaining section obtains the electronic data identification information using a predetermined process, the execution environment determining section may generate the remote manipulation program. In the information processing apparatus, the remote manipulation program may cause the computer to further perform a procedure for obtaining the electronic data identified by the electronic data identification information via the second communication path and transmitting an instruction to instruct the execution environment to process the obtained electronic data to the execution environment via the first communication path.

A third aspect of the present invention provides an information processing apparatus comprising a virtual server that executes electronic data by remote manipulation from a client terminal. The virtual server may include:
a first communicating section that communicates with the client terminal via a first communication path in response to a user's instruction at the client terminal;
a second communicating section that obtains electronic data corresponding to the user's instruction via a second communication path from a terminal different from the client terminal;
an electronic file executing section that executes the obtained electronic data; and
a screen information transmitting section that transmits, via the first communication path, screen information to be displayed for the user to the client terminal.

A fourth aspect of the present invention provides a program to cause a computer to function as the information processing apparatus. A storage medium having stored thereon the program may be provided.

The summary clause does not necessarily describe all necessary features of the embodiments of the present invention. The present invention may also be a sub-combination of the features described above.

DESCRIPTION OF EXEMPLARY EMBODIMENTS

Figure 1:
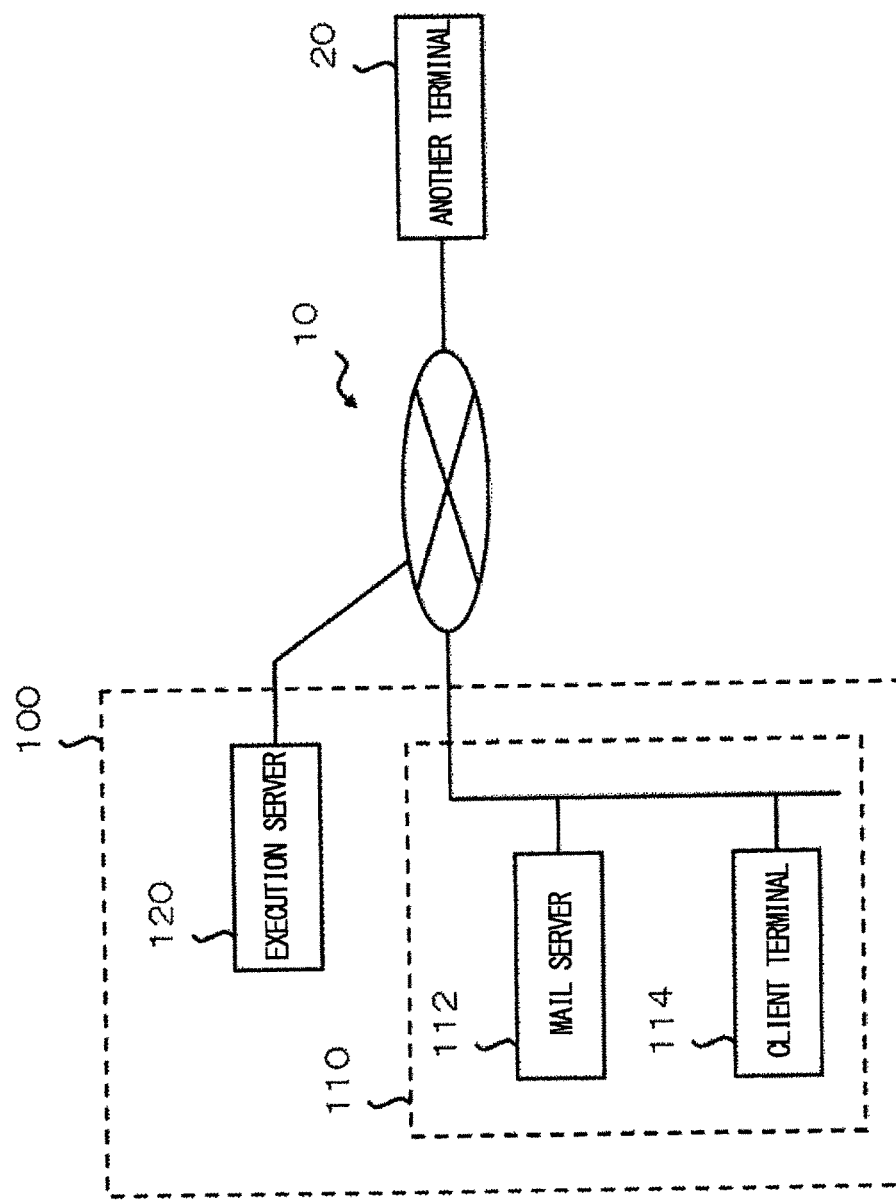
FIG. 1 schematically shows an example of a file transfer system 100.

Hereinafter, some embodiments of the present invention will be described. The embodiments do not limit the invention according to the claims, and all the combinations of the features described in the embodiments are not necessarily essential to means provided by aspects of the invention. In the drawings, identical or similar parts may be assigned with identical reference numerals so that the parts do not need to be described repeatedly. The technical features described in relation to a particular embodiment can be applied to other embodiments provided that they are consistent with the other embodiments from the technical perspective.

FIG. 1 schematically shows an example of a file transfer system 100. In the present embodiment, the file transfer system 100 includes a mail system 110 and an execution server 120. The mail system 110 includes a mail server 112 and a client terminal 114. In the present embodiment, the mail system 110 and the execution server 120 exchange information via a network 10. The file transfer system 100, the mail system 110, the mail server 112, the client terminal 114 and the execution server 120 may be each an exemplary information processing apparatus. The execution server 120 may be an exemplary execution environment. The network 10 may be an exemplary communication line.

The constituents of the file transfer system 100 may be realized by hardware, software or a combination of hardware and software. A computer may function at least as part of the file transfer system 100 in response to executing a program. The program may be stored on a computer readable medium such as a CD-ROM, a DVD-ROM, a memory, or a hard disk, or stored on a storage device connected to a network. The program may be installed from the computer readable medium or the storage device connected to the network, to a computer constituting at least part of the file transfer system 100.

The program to cause the computer to function at least as part of the file transfer system 100 may include a module defining the operations of the respective constituents of the file transfer system 100. The program or module is used by a processor, a communication interface, a storage device and the like to cause a computer to function as the constituents of the file transfer system 100 or to cause a computer to perform an information processing method of the file transfer system 100.

When read by a computer, the information processing described in the program embodies concrete means achieved by a combination of software and various hardware resources of the file transfer system 100. The concrete means performs operations or processes on information depending on the intended uses of a computer according to the present embodiment, which results in constructing the file transfer system 100 compatible with the intended uses.

The constituents of the file transfer system 100 may be realized by virtual servers or cloud systems. The constituents of the file transfer system 100 may be constructed on the same network or may be constructed on different networks. The constituents of the file transfer system 100 may be constructed on the same physical server or may be constructed on different physical servers.

The file transfer system 100 exchanges information with another terminal 20 via the network 10. In one embodiment, when electronic data received from the other terminal 20 contains an electronic file, the file transfer system 100 uses the mail system 110 to extract the electronic file and transfers the extracted electronic file from the mail system 110 to the execution server 120.

In the present embodiment, the electronic file is executed on the execution server 120. In this way, even when the electronic file is infected with a virus, the mail system 110 can be prevented from being infected with the virus. In addition, for example, even when a terminal of the mail system 110 imposes a limitation on the receivable size of electronic data and thus cannot receive the electronic file, even when the terminal cannot receive the electronic file due to a too small capacity of its storage device, or even when the terminal cannot execute the electronic file since no application that is capable of executing the electronic file is installed on the terminal, the receiver of the electronic data can view the electronic file.

In a different embodiment, when electronic data to be transmitted to the other terminal 20 contains an electronic file, the file transfer system 100 uses the mail system 110 to extract the electronic file and transfers the extracted electronic file from the mail system 110 to the execution server 120. The mail system 110 notifies the other terminal 20 of the URI of the transferred electronic file. In this way, the user of the other terminal 20 can access the electronic file transferred to the execution server 120.

In the present embodiment, the electronic file is executed on the execution server 120. In this way, even when the electronic file is infected with a virus, the other terminal 20 can be prevented from being infected with the virus. In addition, the electronic data to be transmitted to the other terminal 20 can have a smaller size. As a result, for example, even when the other terminal 20 imposes a limitation on the receivable size of electronic data and thus cannot receive the electronic file, even when the other terminal 20 cannot receive the electronic file due to a too small capacity of its storage device, or even when the other terminal 20 cannot execute the electronic file since no application that is capable of executing the electronic file is installed on the other terminal 20, the user of the other terminal 20 can view the electronic file.

As described above, even when the electronic file is infected with a new virus that cannot be addressed by virus inspection software, the file transfer system 100 can safely execute the electronic file. In addition, even when a computer using an OS for which technical support is no longer provided acquires electronic data containing an electronic file, the file transfer system 100 can safely execute the electronic file.

The electronic file can be, for example, an executable file, an application file to be executed by an application, a script and the like. The application file can be, for example, a text file, a Word file, a PDF file, a JPEG file and the like. Executing the electronic file can mean any processes that are performed on the electronic file, including not only executing an executable file but also viewing, printing, editing, copying, moving, transmitting or saving the electronic file, converting the format of the electronic file, copying the contents of the electronic file onto a clipboard, capturing a screen, opening the electronic file using a predetermined application, performing an operation on the electronic file using a predetermined application and the like.

The network 10 may be a wired communication transmission path, a wireless communication transmission path or a combination of both. The network 10 may be the Internet, a dedicated line, a wireless communication network, or a combination of these.

The other terminal 20 may be any device that is capable of exchanging information with the file transfer system 100 and can be a personal computer, a mobile terminal, a wireless terminal, consumer electronics or the like. The mobile terminal can be, for example, a mobile telephone, a smart phone, a PDA, a tablet, a wearable device, a notebook computer, a laptop computer and the like.

The other terminal 20 may be realized by activating software defining the operations of the constituents of the other terminal 20 in a general information processing apparatus constituted by a data processing device including a CPU, a ROM, a RAM, a communication interface and the like, an input device such as a keyboard, touch panel or a microphone, an output device such as a display device, a speaker or a vibration device, and a storage device such as a memory or a HDD. The other terminal 20 may be realized by virtual servers or cloud systems.

The mail server 112 exchanges e-mails with the other terminal 20 via the network 10. The e-mail may contain an attached file. The e-mail may be exemplary electronic data. The attached file may be an exemplary electronic file.

The mail server 112 receives an e-mail addressed to the client terminal 114 from the other terminal 20. When the received e-mail contains an attached file, the mail server 112 extracts the attached file from the e-mail. The mail server 112 transmits the extracted attached file to the execution server 120. Additionally, the mail server 112 creates notification data to indicate that it has received the e-mail from the other terminal 20 and transmits the notification data to the client terminal 114.

The mail server 112 receives an e-mail addressed to the other terminal 20 from the client terminal 114. When the received e-mail contains an attached file, the mail server 112 extracts the attached file from the e-mail. The mail server 112 transmits the extracted attached file to the execution server 120. Additionally, the mail server 112 creates notification data indicating that it has received the e-mail from the client terminal 114 and transmits the notification data to the other terminal 20.

Before transmitting the extracted attached file to the execution server 120, the mail server 112 may convert the attached file. The mail server 112 may transmit the converted attached file to the execution server 120. The converted attached file may be an exemplary file related to an electronic file.

The mail server 112 may convert the attached file so that execution of the attached file on the client terminal 114 becomes difficult as compared with the original attached file. Converting the received attached file can include, for example, changing the format, extension or name of the attached file, encrypting the attached file, converting the structure of the attached file and the like.

The notification data may contain information regarding an access to the extracted attached file. The information regarding the access to the extracted attached file may indicate the URI of the attached file or converted attached file. The URI of the attached file or converted attached file may be an URL indicating the location at which the attached file or converted attached file is stored on the execution server 120. The information regarding the access to the extracted attached file may be an example of at least one of destination identification data and execution environment identification data.

The information regarding the access to the attached file may be a remote manipulation program to cause a computer to perform a procedure for establishing a communication path between the computer and a different computer that has the attached file or converted attached file stored thereon. The remote manipulation program may be an executable file or an application file of a remote manipulation application that is installed in advance on the computer. The remote manipulation program may be a script. The communication path may be designed to allow the computer executing the remote manipulation program to remotely manipulate a different computer storing thereon the attached file or the converted attached file.

The remote manipulation program may be a program to cause the computer to further perform a procedure for transmitting, to the above-mentioned different computer via the communication path enabling remote manipulation, an execution instruction to instruct the different computer to execute the attached file thereon. The remote manipulation program may be a program to cause the computer to further perform a procedure for transmitting, to the above-mentioned different computer via the communication path enabling remote manipulation, an instruction to instruct the different computer to convert the converted attached file back to the original attached file thereon.

In one embodiment, the mail server 112 converts the file format of the attached file from the file format compatible with the application used to create the attached file to the file format compatible with the remote manipulation application. The client terminal 114 has stored thereon, for example, the file format or extension of an electronic file in association with information indicative of whether or not to execute the electronic file associated with the file format or extension on the client terminal 114. The client terminal 114, for example, detects changing of association information performed by an OS and changing of association information by a user, and re-changes association information. The association information, for example, associates the file format or extension of an electronic file with an application that can use the electronic file. The client terminal 114 may monitor activation of an executable file by an OS, and detect activation of the executable file.

In this way, for example when the client terminal 114 accepts an instruction to instruct the client terminal 114 to execute the attached file having the converted file format, the attached file having the converted file format can be executed on the client terminal 114. When the attached file having the converted file format is executed on the client terminal 114, the remote manipulation application that is installed in advance on the client terminal 114 is activated.

When the file format or extension of the attached file having the converted file format is not associated with information indicative of whether or not to execute the attached file on the client terminal 114, the client terminal 114 may display on a display device a screen for allowing a user to choose whether or not to execute the file on the client terminal, and receive a result of choice by the user via an input device. When the file format or extension of the attached file having the converted file format is not associated with information indicative of whether or not to execute the attached file on the client terminal 114, the client terminal 114 may determine not to execute the file on the client terminal.

When the remote manipulation application is activated, the client terminal 114, for example, reads the information regarding the access to the attached file from the notification data and transmits the attached file to the computer indicated by the read information regarding the access. In addition, the client terminal 114 establishes a communication path enabling remote manipulation between the client terminal 114 and the computer indicated by the information regarding the access.

In a case where the extension of the attached file is converted, the communication path enabling remote manipulation may be also established in the same manner as in the case where the file format of the attached file is converted. The attached file having the converted file format or extension may be an exemplary remote manipulation program.

The client terminal 114 is used by the user of a file transfer service provided by the file transfer system 100. The client terminal 114 exchanges e-mails with the other terminal 20 via the mail server 112. The client terminal 114 receives, from the mail server 112, the notification data indicating that the mail server 112 has received an e-mail from the other terminal 20. The client terminal 114 accesses the execution server 120 using the information, included in the notification data, regarding the access to the attached file included in the notification data.

The client terminal 114 may be any device that is capable of exchanging information with the other terminal 20, the mail server 112 and the execution server 120 and may be a personal computer, a mobile terminal, a wireless terminal, consumer electronics or the like. The mobile terminal can be, for example, a mobile telephone, a smart phone, a PDA, a tablet, a wearable device, a notebook computer, a laptop computer and the like.

The client terminal 114 may remotely manipulate the execution server 120. For example, in response to the execution of a remote manipulation program included in the notification data, a communication path enabling remote manipulation is established between the client terminal 114 and the execution server 120. The client terminal 114 may establish the communication path enabling remote manipulation between the client terminal 114 and the execution server 120 by activating the remote manipulation program that is installed thereon in advance. For example, the client terminal 114 and the execution server 120 use protocols such as a remote desktop protocol (RDP), RDP over HTTPS, ICA, Protocol, or PCoIP so that a user's input is transmitted from the client terminal 114 to the execution server 120 and screen information of the execution server 120 is transmitted from the execution server 120 to the client terminal 114.

The client terminal 114 transmits, to the execution server 120 via the communication path enabling remote manipulation, an execution instruction to instruct the execution server 120 to execute the attached file thereon. The client terminal 114 may transmit the execution instruction when a user opens the e-mail or transmit the execution instruction when a user attempts to execute the attached file. When the execution server 120 has the converted attached file stored thereon, the client terminal 114 may transmit, to the execution server 120 via the communication path enabling remote manipulation, an instruction to instruct the execution server 120 to convert the converted attached file back into the original attached file.

The client terminal 114 may share at least part of information stored in a clipboard with a clipboard of the execution server 120. The client terminal 114 may not share at least part of information stored in a clipboard with a clipboard of the execution server 120.

The execution server 120 exchanges information with the mail server 112, the client terminal 114 and the other terminal 20. The execution server 120 includes a virtual server that is configured to execute an electronic file in response to remote manipulation performed by the client terminal 114 or the other terminal 20. The execution server 120 receives, from the mail server 112, the extracted attached file or converted attached file. The execution server 120 stores the received attached file or converted attached file thereon.

The execution server 120 receives a user's instruction via the client terminal 114 or other terminal 20. The execution server 120 may establish a communication path enabling remote manipulation through which the execution server 120 can be remotely manipulated between the execution server 120 and one of the client terminal 114 and the other terminal 20 and receive a user's instruction via the communication path. The user inputs an instruction to the execution server 120 for example by using a mouse, a keyboard or the like of the client terminal 114. For example, the execution server 120 executes the attached file in response to the user's instruction. The execution server 120 may convert the converted attached file back into the original attached file in response to an instruction to instruct the execution server 120 to execute the attached file or a different instruction than this execution instruction.

When the execution server 120 is remotely manipulated, the screen information of the execution server 120 is transmitted from the execution server 120 to one of the client terminal 114 and the other terminal 20. When the execution server 120 is remotely manipulated, the communication from the execution server 120 to one of the client terminal 114 and the other terminal 20 is restricted. Thus, even when the execution server 120 is infected with a virus as a result of executing the attached file, the virus can be prevented from diffusing from the execution server 120 to one of the client terminal 114 and the other terminal 20.

The execution server 120 may restrict access from a user. For example, the execution server 120 has stored thereon identification information of a user in association with identification information of a directory that the user is allowed to access. In this way, a particular directory that a particular user can read from and write in can be restricted.

In the present embodiment, the case where the mail system 110 of the file transfer system 100 includes the mail server 112, and the mail server 112 processes an electronic file is described. However, the file transfer system 100 and the mail system 110 are not limited to the present embodiment. In a different embodiment, the file transfer system 100 and the mail system 110 may include a proxy server instead of or in addition to the mail server 112, and at least part of information processing by the mail server 112 may be executed by the proxy server. The proxy server may be one example of an information processing apparatus.

Figure 2:
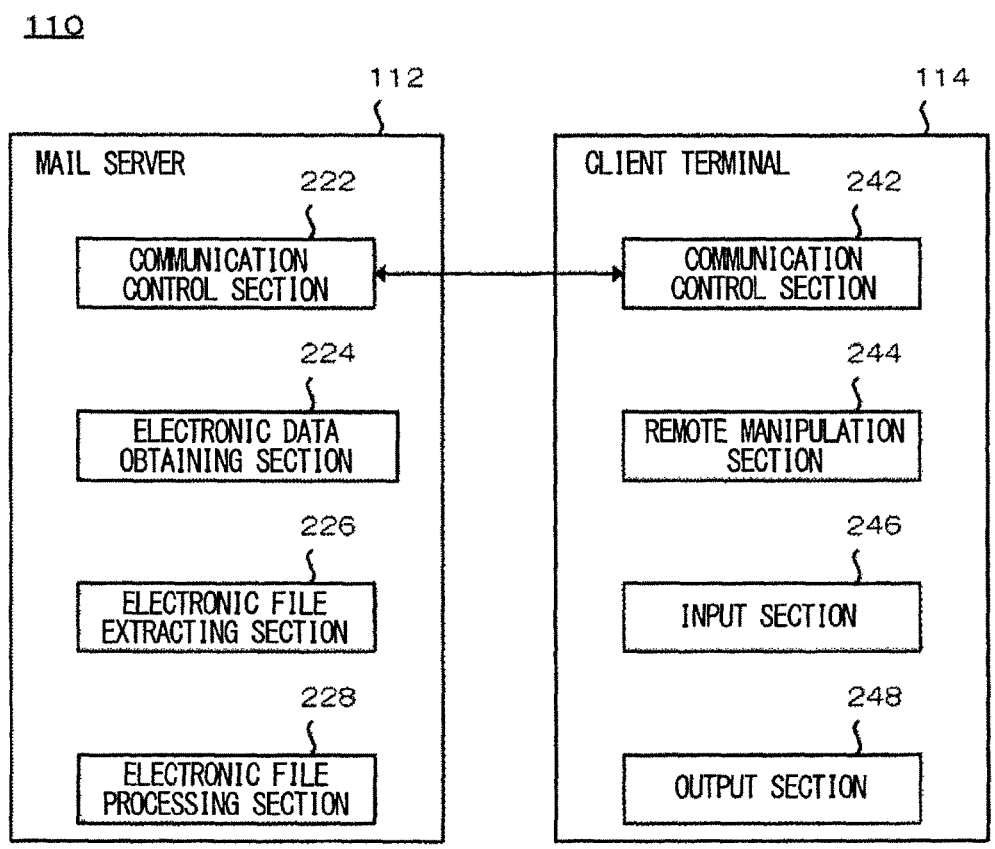
FIG. 2 schematically shows an example of a mail system 110.

FIG. 2 schematically shows an example of the mail system 110. The following description of FIG. 2 mainly focuses on the operations of the respective constituents of the mail system 110 in an exemplary case where the mail system 110 receives from the other terminal 20 an e-mail addressed to the client terminal 114.

In the present embodiment, the mail server 112 includes a communication control section 222, an electronic data obtaining section 224, an electronic file extracting section 226, and an electronic file processing section 228. The constituents of the mail server 112 may exchange information with each other. In the present embodiment, the client terminal 114 includes a communication control section 242, a remote manipulation section 244, an input section 246, and an output section 248. The constituents of the client terminal 114 may exchange information with each other.

The communication control section 222 controls communication between the mail server 112 and an external computer. The external computer can be, for example, the other terminal 20, the client terminal 114, the execution server 120 and the like. The communication control section 222 may be a communication interface. The communication control section 222 may be compatible with a plurality of communication techniques.

The communication control section 222 may have a firewall function. The communication control section 222 may set a firewall so that the client terminal 114 cannot access directly to information stored on the mail server 112.

The electronic data obtaining section 224 obtains electronic data. For example, the electronic data obtaining section 224 obtains an e-mail transmitted to the mail system 110. The electronic data obtaining section 224 transmits the obtained e-mail to the electronic file extracting section 226. In the present embodiment, the electronic data obtaining section 224 obtains an e-mail from the other terminal 20. However, the electronic data obtaining section 224 is not limited to the present embodiment. The electronic data obtaining section 224 may obtain electronic data stored on a storage device such as a hard disk, a memory, a file sharing server and the like, or obtain electronic data from other applications.

The electronic file extracting section 226 extracts an electronic file from the electronic data. For example, the electronic file extracting section 226 receives, from the electronic data obtaining section 224, the e-mail obtained by the electronic data obtaining section 224. The electronic file extracting section 226 judges whether the received e-mail contains an attached file. When judging that the received e-mail contains an attached file, the electronic file extracting section 226 extracts the attached file from the e-mail.

The electronic file extracting section 226 transmits the extracted attached file to the electronic file processing section 228. The electronic file extracting section 226 may distinguish the attached file and the portions of the e-mail excluding the attached file from each other and transmit the attached file and the remaining portions of the e-mail separately to the electronic file processing section 228. Thus, the electronic file processing section 228 can create notification data using the header information included in the e-mail, information regarding the e-mail text and the like.

The electronic file processing section 228 performs various operations on the extracted electronic file. For example, the electronic file processing section 228 receives from the electronic file extracting section 226 the attached file and the portions of the e-mail excluding the attached file. The electronic file processing section 228 determines an execution environment in which the received attached file should be executed. The execution environment may be constructed on a virtual server. In this manner, even when the execution environment is infected with a virus, the execution environment can be easily reconstructed.

The electronic file processing section 228 may determine the above-described execution environment based on user identification information identifying the user of the client terminal 114. For example, the electronic file processing section 228 first determines that the attached file should be executed on the execution server 120, based on the user identification information. Subsequently, the electronic file processing section 228 determines the location at which the attached file is to be stored on the execution server 120.

The electronic file processing section 228 may obtain, from the execution server 120, information regarding a location at which the attached file is stored on the execution server 120, and determine the location at which the attached file is stored. For example, the electronic file processing section 228 transmits to the execution server 120 information such as the user identification information, the format of the attached file, the size of the attached file and the like and requests the execution server 120 to notify the electronic file processing section 228 of the information regarding the location at which the attached file is to be stored when the electronic file processing section 228 transmits the attached file to the execution server 120. In response to the request issued by the electronic file processing section 228, the execution server 120 determines the location at which the attached file is to be stored based on the information such as the user identification information, the format of the attached file, the size of the attached file and the like.

The electronic file processing section 228 may convert the received attached file. Converting the attached file can be, for example, changing the format, extension or name of the attached file, encrypting the attached file and the like.

Encryption of the attached file may be executed by an application program that executes encryption processing.

The electronic file processing section 228 creates the notification data including the information regarding the access to the attached file based on the information regarding the location at which the attached file is stored on the execution server 120. The electronic file processing section 228 may create the notification data using the header information contained in the e-mail, the information regarding the e-mail text and the like.

The electronic file processing section 228 transfers the attached file or the converted attached file. The electronic file processing section 228 may transfer the attached file or the converted attached file to the execution server 120. The electronic file processing section 228 may transfer to the client terminal 114 the attached file or the converted attached file together with the notification data, or include the attached file or the converted attached file in the notification data and transfer the resulting notification data to the client terminal 114.

When the electronic file processing section 228 executes various operations on the extracted electronic file, the electronic file processing section 228 obtains information regarding an execution environment of the electronic file on the execution server 120. The electronic file processing section 228 may obtain information regarding the execution environment from the execution server 120. The information regarding the execution environment can be, for example, information identifying a server to be the execution environment, an expiration limit of the server, a user ID of a user of the file transfer system 100 or the client terminal 114 in the server, a password associated with the user ID and the like.

The communication control section 242 controls the communication between the client terminal 114 and an external computer. The external computer can be, for example, the other terminal 20, the mail server 112, the execution server 120 and the like. The communication control section 242 may be a communication interface. The communication control section 242 may be compatible with a plurality of communication techniques.

The communication control section 242 may execute authentication processing with the execution server 120. The communication control section 242 may transmit authentication information of the client terminal 114 to the execution server 120. Authentication information of the client terminal 114 may be information to be used for authentication techniques such as LDAP authentication or NTLM authentication.

In one embodiment, the communication control section 242 causes a display device of the output section 248 to display an authentication screen, and obtains authentication information from a user while executing authentication processing with the execution server 120. The communication control section 242 uses the authentication information obtained from the user to execute the authentication processing. The authentication information can be, for example, identification information of the execution server 120 such as an IP address, a user ID, password information of the user ID and the like.

In a different embodiment, the communication control section 242 receives authentication information from the execution server 120 in advance, and stores it on a storage device of the client terminal 114. The communication control section 242 uses the authentication information stored on the storage device to execute the authentication processing. In this way, the authentication processing can be completed without causing an authentication screen to be displayed and obtaining authentication information from a user while executing the authentication processing with the execution server 120.

The communication control section 242 may control time during which connection is established with the execution server 120. When a predetermined duration has expired after communication with the execution server 120 has been started, the communication control section 242 may restrict communication with the execution server 120. A communication restriction method can be, for example, blocking of communication, restriction of a communication speed and the like.

The remote manipulation section 244 establishes a communication path enabling remote manipulation between the client terminal 114 and the execution server 120. The remote manipulation section 244 transmits to the execution server 120 an instruction made by the user of the client terminal 114, via the communication path enabling remote manipulation.

The remote manipulation section 244 remotely manipulates the execution server 120 based on the user's instruction input into the input section 246. For example, the remote manipulation section 244 transmits to the execution server 120 an execution instruction to instruct the execution server 120 to execute the attached file thereon. The remote manipulation section 244 obtains screen information of the execution server 120 from the execution server 120. The remote manipulation section 244 transmits the screen information to the output section 248. In this way, the user of the client terminal 114 can safely view the attached file stored on the execution server 120.

When the user desires to download the attached file to the client terminal 114, the user inputs into the input section 246 a transfer instruction to instruct the execution server 120 to transfer the attached file stored on the execution server 120 to the client terminal 114. The remote manipulation section 244 receives the user's transfer instruction from the input section 246 and transmits the transfer instruction to the execution server 120. In this way, the user can safely obtain the attached file.

The remote manipulation section 244 may be realized by executing a program that is installed in advance on the client terminal 114. The remote manipulation section 244 may be realized by executing, on the client terminal 114, a remote manipulation program included in the notification data received from the electronic file processing section 228.

When establishing a communication path enabling remote manipulation between the client terminal 114 and the execution server 120, or when transmitting, to the execution server 120, an instruction from a user of the client terminal 114 via a communication path enabling remote manipulation, the remote manipulation section 244 may obtain information regarding an execution environment on the execution server 120. The remote manipulation section 244 may obtain information regarding the execution environment from the execution server 120. The information regarding the execution environment can be, for example, information identifying a server to be the execution environment, an expiration limit of the server, a user ID of a user of the file transfer system 100 or the client terminal 114 in the server, a password associated with the user ID and the like.

The input section 246 receives an input from a user. The input section 246 can be, for example, a keyboard, a mouse, a touch panel, a microphone and the like. The output section 248 outputs information for the user. The output section 248 can be, for example, a display device, a speaker and the like.

Figure 3:
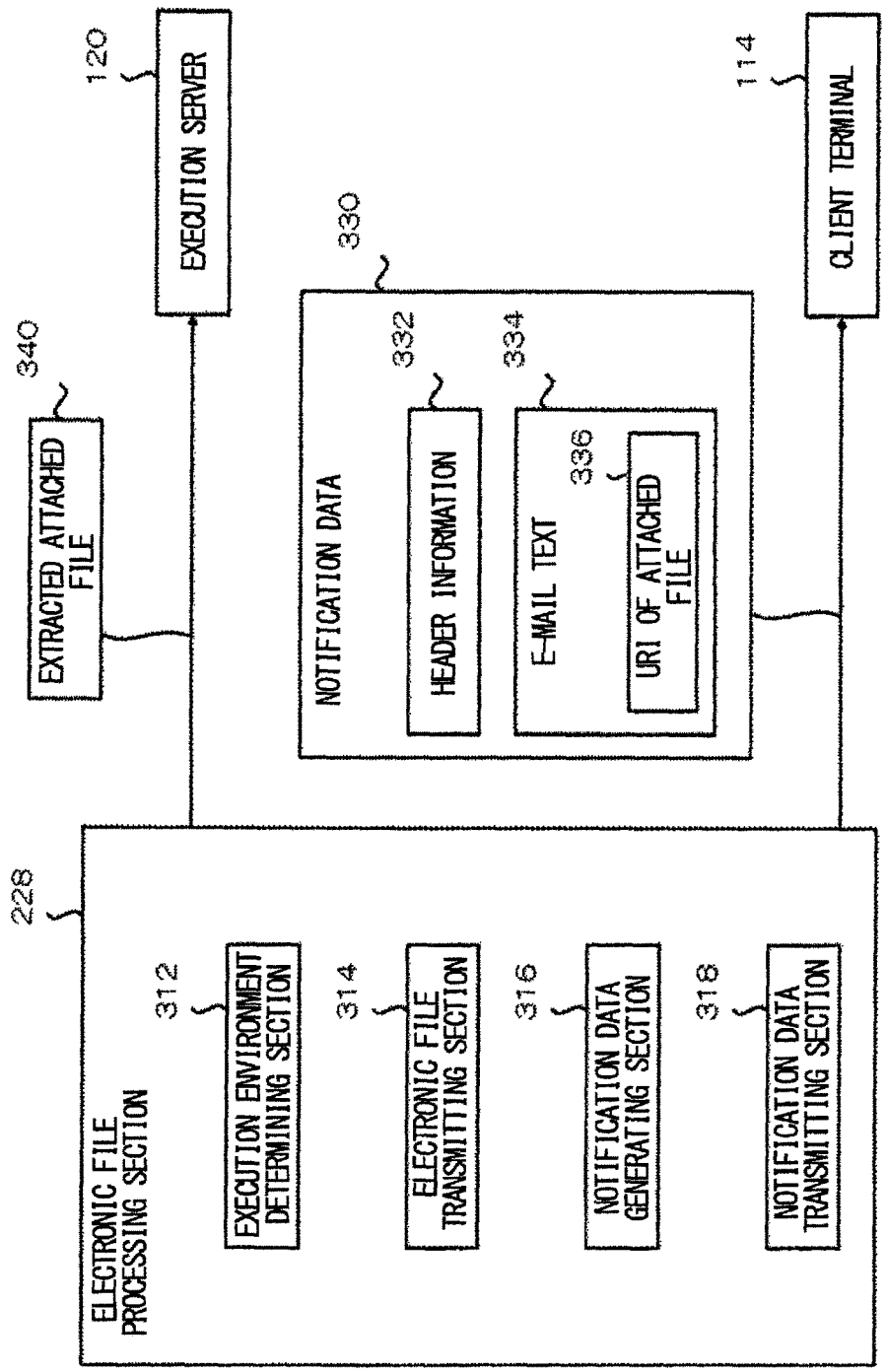
FIG. 3 schematically shows an example of an electronic file processing section 228.

FIG. 3 schematically shows an example of the electronic file processing section 228. The following description of FIG. 3 mainly focuses on the description of the operations of the respective constituents of the electronic file processing section 228 in an exemplary case where the electronic file processing section 228 transfers an attached file 340 that is extracted from an e-mail to the execution server 120. In the present embodiment, the electronic file processing section 228 includes an execution environment determining section 312, an electronic file transmitting section 314, a notification data generating section 316, and a notification data transmitting section 318. The notification data generating section 316 may be an exemplary file converting section.

The execution environment determining section 312 determines the execution environment in which the attached file 340 that has been extracted by the electronic file extracting section 226 is to be executed. In one embodiment, the execution environment determining section 312 stores user identification information identifying each of one or more users in association with server identification information identifying a virtual server assigned to the user, and determines a virtual server in which the attached file 340 is to be executed based on the user identification information identifying the user of the client terminal 114.

In a different embodiment, the execution environment determining section 312 determines a virtual server in which the attached file 340 is to be executed based on identification information of the client terminal 114, a protocol of an URI to be connected (for example, HTTP, FTP, etc.), an URI to be connected, an IP address of a connection source, the version of an IP address of a connection source, information regarding the producer, receiver, file name, file format, extension, file size or the like of the attached file 340. In a different embodiment, the execution environment determining section 312 randomly determines a virtual server in which the attached file 340 is to be executed from among one or more virtual servers.

In a further different embodiment, the execution server 120 determines a virtual server in which the attached file 340 is to be executed. In one embodiment, the execution environment determining section 312 requests the execution server 120 to determine the execution environment in which the attached file 340 is to be executed. The execution server 120 determines an execution environment in which the attached file 340 is to be executed for example based on identification information of the client terminal 114, identification information of a user of the client terminal 114, a protocol of an URI to be connected (for example, HTTP, FTP, etc.), an URI to be connected, an IP address of a connection source, the version of an IP address of a connection source, information regarding the producer, receiver, file name, file format, extension, file size or the like of the attached file 340. The execution server 120 notifies the execution environment determining section 312 of the determined execution environment. In this way, the execution environment determining section 312 can determine the execution environment in which the attached file 340 is to be executed.

The execution environment determining section 312 may determine the location at which the attached file 340 is stored in the execution environment. The execution environment in which the attached file 340 is to be executed may be determined based on the location at which the attached file 340 is stored. The execution environment determining section 312 may transmit at least one of the information identifying the execution environment and the information indicating the location at which the attached file is stored, to the electronic file transmitting section 314 and the notification data generating section 316.

The execution environment determining section 312 may obtain information regarding an execution environment for example when the attached file is executed or when a remote manipulation protocol is executed. The remote manipulation section 244 may obtain the information regarding an execution environment from the execution server 120. The information regarding the execution environment can be, for example, information identifying a server to be the execution environment, an expiration limit of the server, a user ID of a user of the file transfer system 100 or the client terminal 114 in the server, a password associated with the user ID and the like.

In the present embodiment, the case where the execution environment determining section 312 is arranged in the electronic file processing section 228 is described. However, the execution environment determining section 312 is not limited to the present embodiment. The execution environment determining section 312 may be arranged in the execution server 120.

The electronic file transmitting section 314 transmits the attached file 340 to the execution server 120, for example, based on the determination of the execution environment determining section 312. The electronic file transmitting section 314 may transmit the converted attached file 340 to the execution server 120.

The notification data generating section 316 generates notification data 330 indicating that an e-mail has been received from the other terminal 20. In the present embodiment, the notification data generating section 316 generates the notification data 330 for the client terminal 114. The notification data 330 for the client terminal 114 includes header information 332 and e-mail text 334. The e-mail text 334 includes an URI 336 of the attached file 340. The URI 336 may be a URL indicating the location at which the attached file 340 or the converted attached file 340 is stored on the execution server 120. The notification data 330 may be an exemplary data structure. The URI 336 may be exemplary information regarding the access to the attached file 340. The URI 336 may be an example of at least one of destination identification data and execution environment identification data.

The notification data generating section 316 may generate the header information 332 using the header information included in the e-mail obtained by the electronic data obtaining section 224. The notification data generating section 316 may generate the e-mail text 334 based on the information regarding the e-mail text included in the e-mail obtained by the electronic data obtaining section 224 and the information regarding the location at which the attached file 340 is stored on the execution server 120, which is determined by the execution environment determining section 312.

The notification data generating section 316 may generate notification data for the execution server 120. The notification data for the execution server 120 may include restriction information to restrict the manipulation of the attached file 340 on the execution server 120.

The restriction information may include user identification information identifying an authorized user of an electronic file in association with allowed or banned manipulation for the user. The restriction information may include electronic file identification information identifying an electronic file in association with allowed or banned manipulation for the electronic file. When an electronic file is encrypted, the restriction information may further include a passcode used to decrypt the electronic file in association with the user identification information or the electronic file identification information.

The user identification information identifying the authorized user of the electronic file can be, for example, a mail address indicating the destination of the e-mail to which the electronic file is attached, information indicating the producer of the electronic file and the like. The electronic file identification information can be, for example, the name of the electronic file and the like. The allowed or banned manipulation can be, for example, viewing, printing, editing, copying, moving, and transmitting the electronic file, copying the contents of the electronic file onto a clipboard, capturing the screen and the like.

When generating the restriction information, the notification data generating section 316 may generate the notification data 330 including at least one of the user identification information and the electronic file identification information included in the restriction information. In this way, for example, when the client terminal 114 receives the notification data 330 and accesses the execution server 120 based on the URI 336 of the attached file 340, the client terminal 114 can transmit to the execution server 120 at least one of the user identification information and the electronic file identification information. The client terminal 114 may transmit to the execution server 120 a user's instruction including at least one of the user identification information and the electronic file identification information.

In a different embodiment, the notification data generating section 316 may store restriction information in a particular proxy server, cloud system or database system (not illustrated). The notification data generating section 316 may receive the restriction information from a different system that has the restriction information stored thereon to execute restriction process. The notification data generating section 316 may generate notification data 330 including an URI of the particular proxy server and information to be used for user authentication in the proxy server.

The notification data transmitting section 318 transmits the notification data 330 to the client terminal 114. The notification data transmitting section 318 may transmit the restriction information to the execution server 120. The notification data transmitting section 318 may delete the attached file 340 or the converted attached file 340 from the mail server 112 after transmitting the notification data 330 to the client terminal 114.

In the present embodiment, a case where the notification data transmitting section 318 transmits the notification data 330 via the network 10 is described. However, the transmission of the notification data 330 by the notification data transmitting section 318 is not limited to the present embodiment. The destination of the notification data 330 may be a storage device on a computer in which the notification data transmitting section 318 is arranged, another application operating on the computer, or an external storage device. The external storage device can be, for example, a hard disk, a memory, a CD-ROM and the like.

In the present embodiment, a case where the attached file 340 is transferred to the execution server 120 is described. However, the electronic file to be transferred is not limited to the attached file 340. The electronic file to be transferred may be the converted attached file 340. For example, the notification data generating section 316 converts the attached file 340. Converting the attached file 340 can include, for example, changing the format, extension or name of the attached file 340, encrypting the attached file 340, and the like. The electronic file transmitting section 314 transmits the converted attached file 340 to the execution server 120. In this manner, the converted attached file 340 is transferred to the execution server 120.

Figure 4:
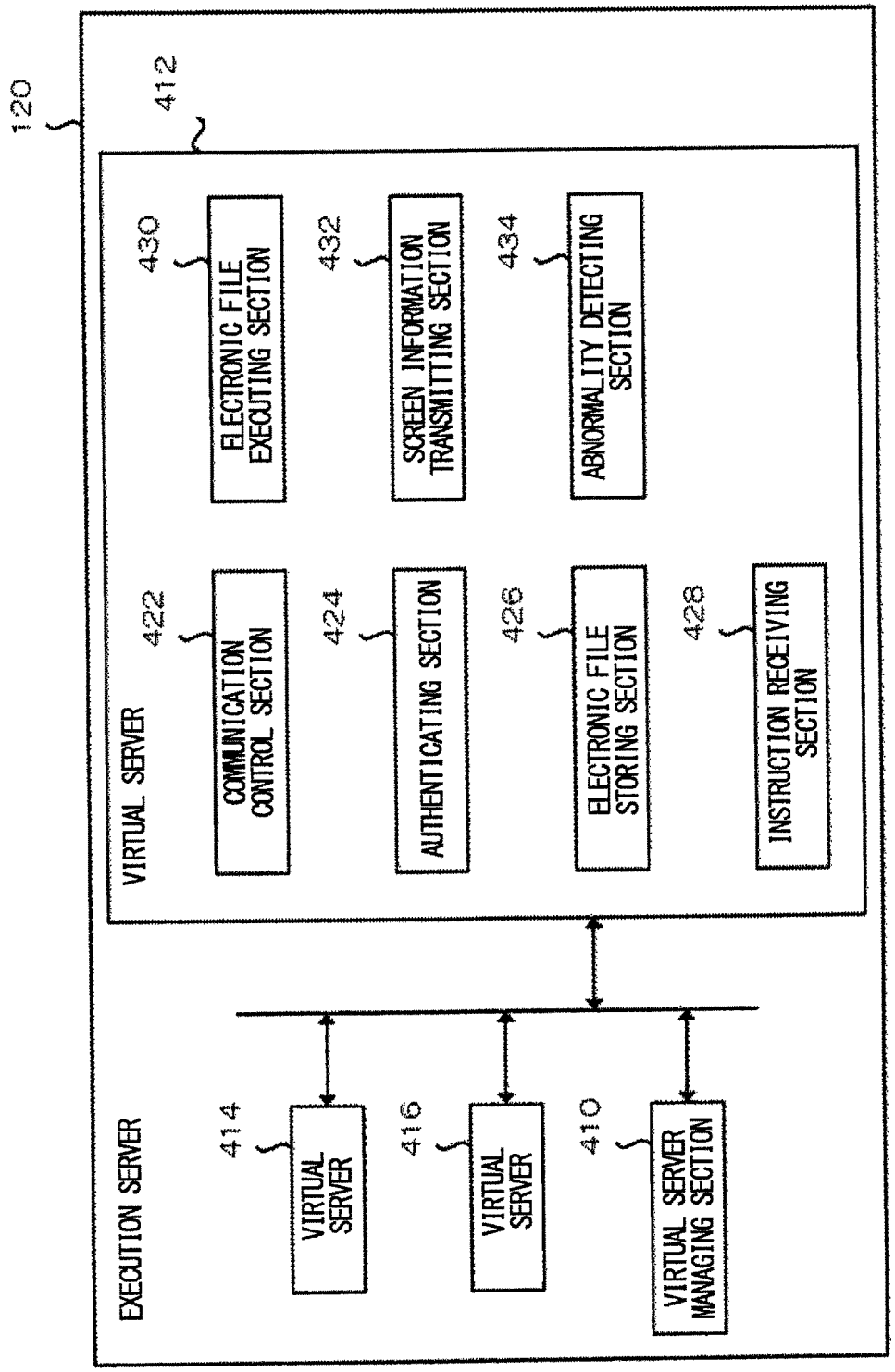
FIG. 4 schematically shows an example of an execution server 120.

FIG. 4 schematically shows an example of the execution server 120. The execution server 120 includes a virtual server managing section 410 and one or more virtual servers. In the present embodiment, the execution server 120 includes, as the one or more virtual servers, a virtual server 412, a virtual server 414 and a virtual server 416.

The virtual server 412 includes a communication control section 422, an authenticating section 424, an electronic file storing section 426, an instruction receiving section 428, an electronic file executing section 430, a screen information transmitting section 432, and an abnormality detecting section 434. The virtual servers 414 and 416 may have the same structure as the virtual server 412. The virtual servers 412, 414 and 416 may each be an example of at least one of the execution environment and the information processing apparatus.

The virtual server managing section 410 may use a protocol such as http, https, ssh, a remote desktop protocol (RDP), RDP over HTTPS, ICA, XProtocol, PCoIP or the like to exchange information with the remote manipulation section 244. At least one of the virtual servers 412, 414 and 416 may use a protocol such as a remote desktop protocol (RDP), RDP over HTTPS, ICA, Protocol, PCoIP or the like to exchange information with the remote manipulation section 244.

The virtual server managing section 410 manages the one or more virtual servers included in the execution server 120. When a predetermined event occurs, the virtual server managing section 410 reconstructs at least one of the one or more virtual servers. In this way, even when one of the virtual servers is infected with a virus, it can be easy to launch a virtual server that is not infected with a virus.

The predetermined event can be, for example, a user's instruction, expiration of a predetermined duration, detection of abnormality by the abnormality detecting section 434, generation of a file in a particular directory, a value being written in a particular registry, a particular value being written in a registry, an end of use of the virtual server by the client terminal 114 and the like. Here, the reconstruction of a virtual server may mean that the virtual server restores its particular state observed after the virtual server is constructed on the execution server 120, or may mean that an OS of the virtual server or the execution server 120 restores its particular state.

The reconstruction of the virtual server may mean that information peculiar to a user of the client terminal 114 restores its state observed before use of the virtual server by the client terminal 114 is started. At this time, settings of information other than the information peculiar to the user or the like may not be changed. The information peculiar to the user can be, for example, an electronic file stored in a user directory, usage history of a browser, information of a registry and the like. The information peculiar to the user may restore its state observed before use of the virtual server by the client terminal 114 is started, when use of the virtual server by the client terminal 114 ended.

The particular state observed after the virtual server is constructed on the execution server 120 can be, for example, the state observed after the virtual server is constructed on the execution server 120 and before a particular application is installed on the virtual server, the state observed immediately after a particular application is installed on the virtual server, the state observed immediately before a reconstruction process is performed and the like. Restoring the particular state of an OS can be, for example, initializing the OS.

The virtual server managing section 410 may store settings about a user in a virtual server on a setting file before performing reconstruction of the virtual server. The virtual server managing section 410 may store a plurality of setting files for each user or each virtual server. Each of the plurality of setting files may have settings about the user at different clock times stored thereon. The virtual server managing section 410 reads out the setting files after reconstructing a virtual server. In this way, the execution server 120 or the virtual server can restore its particular state.

The virtual server managing section 410 may execute a maintenance process of an OS of a virtual server (may be referred to as a guest OS) when the predetermined event has occurred. The maintenance process of the guest OS can be, for example, restoring the particular state of user information used by the guest OS. The virtual server managing section 410 may execute the maintenance process of guest OSs for each guest OS. The particular state can be, for example, a predetermined state or a state specified by a user.

When reconstructing a particular virtual server, or when performing maintenance of a guest OS of the virtual server, the virtual server managing section 410 may update reference information of the virtual server so that a user of the client terminal 114 or the file transfer system 100 cannot refer to the virtual server. When processing of reconstructing a particular virtual server or processing of maintenance of a guest OS of the virtual server has ended, the virtual server managing section 410 may update reference information of the virtual server so that a user of the client terminal 114 or the file transfer system 100 can refer to the virtual server.

The virtual server managing section 410 may determine the execution environment in which the attached file 340 is to be executed, in response to a request from the mail system 110. The virtual server managing section 410 may determine the location at which the attached file 340 is to be stored, in response to a request from the mail system 110. The virtual server managing section 410 may transmit to the mail system 110 at least one of the determined execution environment and the location at which the attached file 340 is to be stored.

The virtual server managing section 410 may determine an environment at which electronic data or an electronic file is to be executed or a location at which it is to be stored based on a present value or predicted value such as loads of the virtual servers 412-416, their resource usage, the number of connections of client terminals or the like. The virtual server managing section 410 may determine a virtual server to which the client terminal 114 is connected based on a present value or predicted value such as loads of the virtual servers 412-416, their resource usage, the number of connections of client terminals or the like.

The virtual server managing section 410 may concentrate loads on at least one of the virtual servers 412-416 or allocate loads so that loads of the virtual servers 412-416 become approximately even. In this way, the virtual servers 412-416 can be operated efficiently. The virtual server managing section 410 may execute processing such as construction of new virtual servers, or reconstruction or deletion of existing virtual servers based on a present value or predicted value such as loads of one or more servers, their resource usage, the number of connections of client terminals or the like.

The virtual server managing section 410 may collectively manage environments of the virtual servers 412-416. For example, the virtual server managing section 410 may collectively edit settings of OSs of the virtual servers 412-416. The virtual server managing section 410 may collectively install applications on or distribute electronic data or electronic files to the virtual servers 412-416.

The virtual server managing section 410 may generate a management screen for managing OSs of the virtual servers 412-416. The management screen may be a GUI or a CUI.

The virtual server managing section 410 may store respective usage histories of the virtual servers 412-416 thereon. The virtual server managing section 410 may store respective usage histories of the virtual servers 412-416 thereon for each client terminal 114 or for each user of the client terminal 114. The usage histories may include information regarding a file executed on a virtual server.

When the virtual server can access an external server, the usage history may include an IP address of for example an external server that the virtual server has accessed.

The virtual server managing section 410 may restrict use of at least one of the virtual servers 412-416 (may be referred to as the virtual server 412, etc.) by the client terminal 114. For example, when a predetermined duration has expired after the client terminal 114 has started using the virtual server 412, etc., the virtual server managing section 410 may restrict use of the virtual server 412, etc. The virtual server managing section 410 may execute processing for extending a utilization duration for the virtual server 412, etc., or may execute processing to terminate use of the virtual server 412, etc. immediately.

The virtual server managing section 410 may obtain, from the virtual server 412, etc., information stored in cookies of a web browser installed on the client terminal 114 or the virtual server 412, etc., a user ID saved in the web browser, password information of each site such as a login password for a web site, setting information of various web sites, setting information of the web browser, a plugin or the like. Note that various plugins may be installed on the web browser. The same applies to a web browser installed on a different information processing apparatus.

The virtual server managing section 410 may store information obtained from the client terminal 114/the virtual server 412, etc. on any storage device such as a storage device of the execution server 120, a storage device of the client terminal 114, a storage device of the mail server 112. The virtual server managing section 410 may store predetermined information among the information obtained from the virtual server 412, etc. in any storage device described above.

The virtual server managing section 410 may transmit proxy information of a web browser installed on the client terminal 114 to the virtual server 412, etc. The virtual server managing section 410 may transmit proxy information corresponding to each of the virtual servers 412-416.

The communication control section 422 controls the communication between the virtual server 412 and an external computer. The external computer can be, for example, the other terminal 20, the mail server 112, the client terminal 114, the virtual server managing section 410, the virtual server 414, the virtual server 416 and the like. The communication control section 422 may be a communication interface. The communication control section 422 may be compatible with a plurality of communication techniques.

The communication control section 422 may establish a communication path enabling remote manipulation between one of the client terminal 114 and the other terminal 20 and the virtual server 412, in response to a request issued by one of the client terminal 114 and the other terminal 20. The communication control section 422 may prohibit the virtual server 412 from transmitting information to an external entity, except for a case where the virtual server 412 responds to a request made to the virtual server 412.

The communication control section 422 may control a duration during which connection is established with the client terminal 114. The communication control section 422 may restrict communication with the client terminal 114 when a predetermined duration after the communication with the client terminal 114 has been started has expired. The restriction method of communication can be, for example, blocking of communication, restriction of communication speed and the like.

Since the virtual server 412 executes the attached file 340 transferred from the client terminal 114, the virtual server 412 can possibly be infected with a virus. However, the communication control section 422 restricts the communication between the virtual server 412 and an external entity. Thus, even when the virtual server 412 is infected with a virus, the virtual server 412 can be prevented from transmitting the virus to an external computer and launching Denial of Service (DOS) attacks against an external computer.

The authenticating section 424 authenticates an external computer or a user. The authenticating section 424 may allow an authenticated computer or user to perform remote manipulation.

The electronic file storing section 426 receives the attached file 340 or the converted attached file 340 from the client terminal 114 or the other terminal 20. The electronic file storing section 426 stores thereon the received attached file 340 or converted attached file 340.

The instruction receiving section 428 receives an instruction from a user (may be referred to as a user's instruction) via the client terminal 114 and the network 10. The instruction receiving section 428 may receive an instruction from a user via the other terminal 20 and the network 10.

The electronic file executing section 430 executes the attached file 340 or the converted attached file 340 in accordance with the user's instruction. For example, when the instruction receiving section 428 receives an execution instruction to instruct the electronic file executing section 430 to execute the attached file 340, the electronic file executing section 430 reads the attached file 340 stored on the electronic file storing section 426 and executes the attached file 340. When the electronic file storing section 426 stores thereon the converted attached file 340, the electronic file executing section 430 may first process the converted attached file 340 into the original attached file 340 and then execute the attached file 340.

When the execution server 120 has received restriction information from the mail server 112, the electronic file executing section 430 may determine whether to respond to the user's instruction based on the restriction information. For example, the electronic file executing section 430 refers to the restriction information to determine whether the manipulation indicated by the user's instruction is allowed or banned for the user or the electronic file. In this way, the manipulation of the electronic file can be restricted.

In one embodiment, the electronic file executing section 430 refers to the user identification information included in the user's instruction and the restriction information to extract allowed or banned manipulation for the user identified by the user identification information. The electronic file executing section 430 compares the manipulation indicated by the user's instruction with the extracted manipulation to determine whether the manipulation indicated by the user's instruction should be executed.

In a different embodiment, the electronic file executing section 430 refers to the name of the electronic file indicated by the user's instruction and the restriction information to extract allowed or banned manipulation for the electronic file. The electronic file executing section 430 compares the manipulation indicated by the user's instruction with the extracted manipulation to determine whether the manipulation indicated by the user's instruction should be executed.

The screen information transmitting section 432 transmits screen information to be displayed for a user. When the instruction receiving section 428 receives a user's instruction from the client terminal 114, the screen information transmitting section 432 transmits to the client terminal 114 screen information to be displayed on the display device of the client terminal 114 via the network 10. When the instruction receiving section 428 receives a user's instruction from the other terminal 20, the screen information transmitting section 432 transmits to the other terminal 20 the screen information to be displayed on the display device of the other terminal 20 via the network 10.

The abnormality detecting section 434 detects abnormality occurring in the virtual server 412. The abnormality detecting section 434 detects abnormality occurring in the virtual server 412 when the virtual server 412 performs an operation different from the operation indicated by the user's instruction. When detecting abnormality occurring in the virtual server 412, the abnormality detecting section 434 may notify the virtual server managing section 410 of the detection of the abnormality.

The abnormality detecting section 434 may perform virus inspection on the attached file 340. When detecting a virus, the abnormality detecting section 434 may generate screen information indicating that the virus has been detected. When detecting a virus, the abnormality detecting section 434 may notify the virtual server managing section 410 of the detection of the virus.

Figure 5:
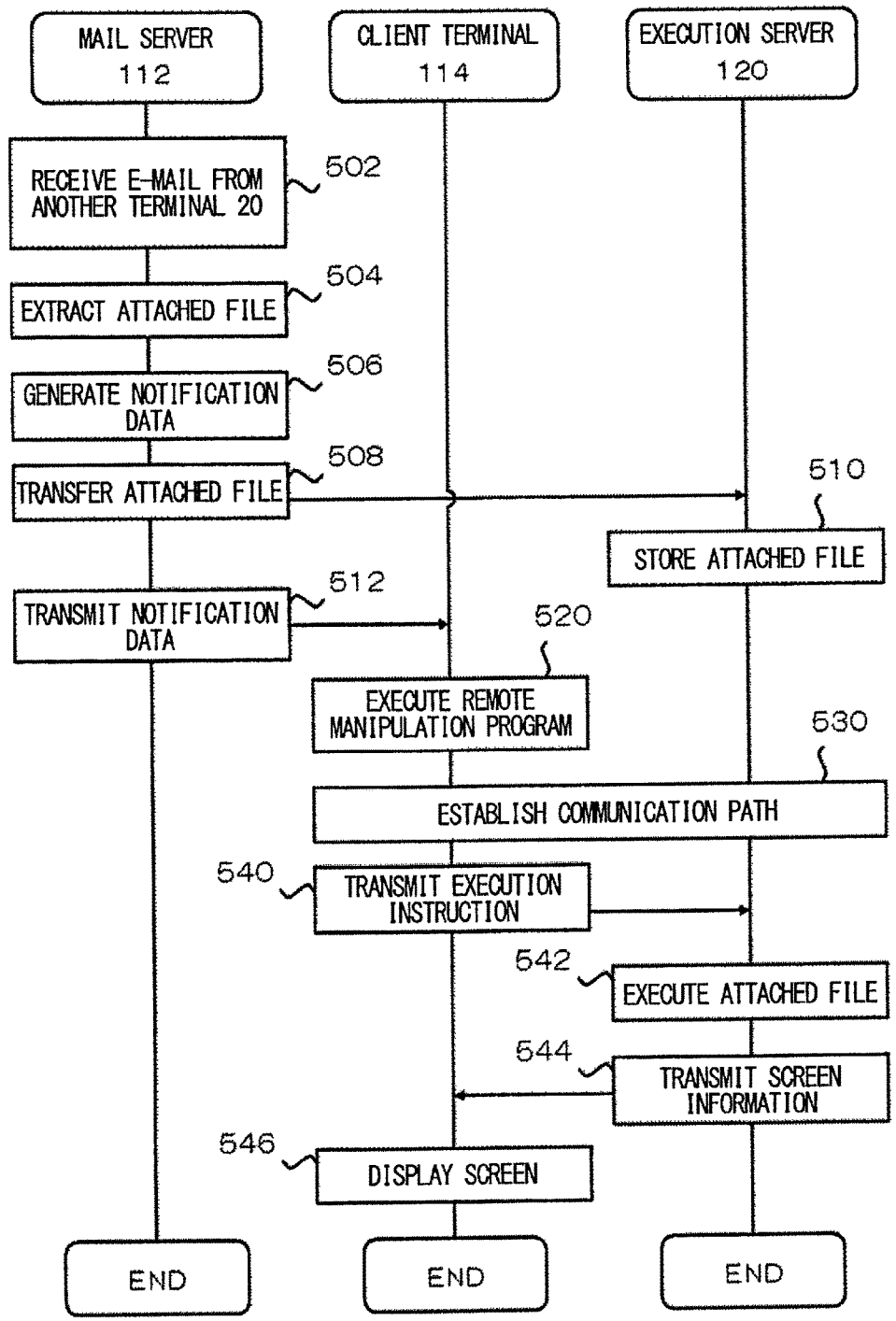
FIG. 5 schematically shows an exemplary process performed in the file transfer system 100.

FIG. 5 schematically shows an exemplary operation performed in the file transfer system 100. FIG. 5 schematically shows an exemplary operation performed when the mail server 112 receives from the other terminal 20 an e-mail addressed to the client terminal 114.

According to the present embodiment, in step 502 (the term "step" may be abbreviated to "S"), the electronic data obtaining section 224 obtains an e-mail addressed to the client terminal 114 from the other terminal 20. In S504, the electronic file extracting section 226 extracts the attached file 340 contained in the e-mail. In S506, the notification data generating section 316 generates the notification data 330. In S508, the electronic file transmitting section 314 transfers the attached file 340 to the virtual server 412. In S510, the electronic file storing section 426 stores thereon the attached file 340. In S512, the notification data transmitting section 318 transmits the notification data 330 to the client terminal 114.

The user of the client terminal 114 checks the notification data 330 on the client terminal 114. In S520, when the user desires to view or download the attached file 340, the user executes a remote manipulation program on the client terminal 114. In S530, the remote manipulation section 244 establishes a communication path enabling remote manipulation between the client terminal 114 and the execution server 120.

In one embodiment, the user activates the remote manipulation program installed on the client terminal 114. Subsequently, the user inputs the URI of the attached file 340 into the remote manipulation program. In this way, the remote manipulation section 244 establishes a communication path enabling remote manipulation between the client terminal 114 and the execution server 120. In a different embodiment, the notification data 330 contains the link to the URI of the attached file 340. Thus, when the user clicks the link, the remote manipulation program installed on the client terminal 114 is activated. In this way, the remote manipulation section 244 establishes a communication path enabling remote manipulation between the client terminal 114 and the execution server 120.

In S540, when the user desires the execution of the attached file 340, the user inputs into the input section 246 an execution instruction to instruct the virtual server 412 to execute the attached file 340 thereon. When the input section 246 receives the execution instruction from the user, the remote manipulation section 244 transmits the execution instruction to the virtual server 412. In S542, when the instruction receiving section 428 receives the execution instruction from the client terminal 114, the electronic file executing section 430 executes the attached file 340. In S544, the screen information transmitting section 432 transmits screen information to the client terminal 114. In S546, the output section 248 displays thereon the screen information.

In the above-described manner, the user can safely view the result of the execution of the attached file 340. When the user desires to download the attached file 340, the user inputs into the input section 246 a transfer instruction to instruct the client terminal 114 to transfer the attached file 340 to the client terminal 114. The remote manipulation section 244 receives the user's transfer instruction from the input section 246 and transmits the transfer instruction to the virtual server 412. In this manner, the user can obtain the attached file 340.

Figure 6:
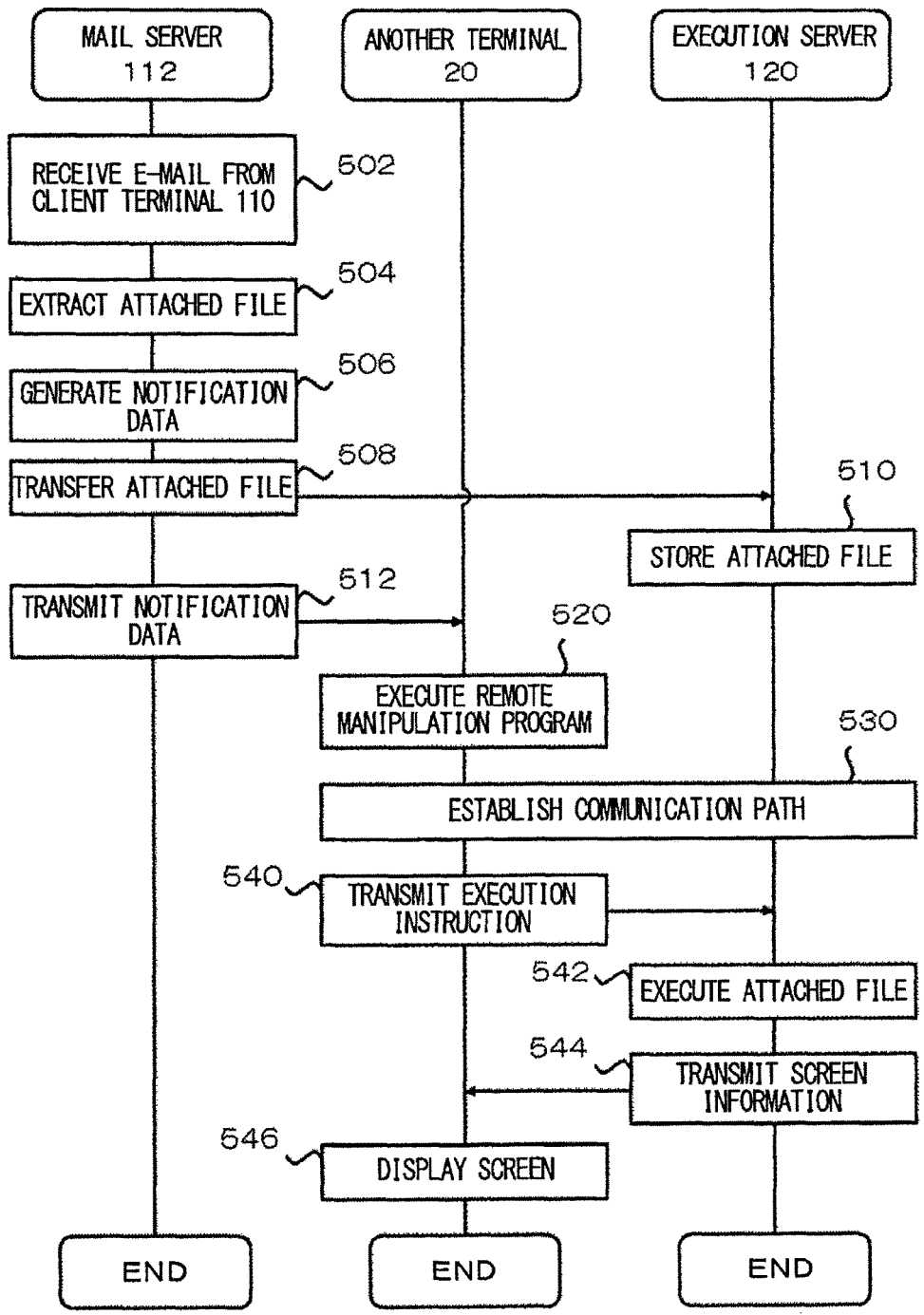
FIG. 6 schematically shows an exemplary process performed in the file transfer system 100.

FIG. 6 schematically shows an exemplary operation performed in the file transfer system 100. FIG. 6 schematically shows an exemplary operation performed when the mail server 112 receives an e-mail addressed to the other terminal 20 from the client terminal 114. The operation shown in FIG. 6 is different from the operation shown in FIG. 5 in that the electronic data obtaining section 224 receives an e-mail addressed to the other terminal 20 from the client terminal 114 in S502 and that the steps after S520 are executed between the other terminal 20 and the virtual server 412. The operation shown in FIG. 6 may be the same as the operation shown in FIG. 5 except for the above-described differences.

Figure 7:
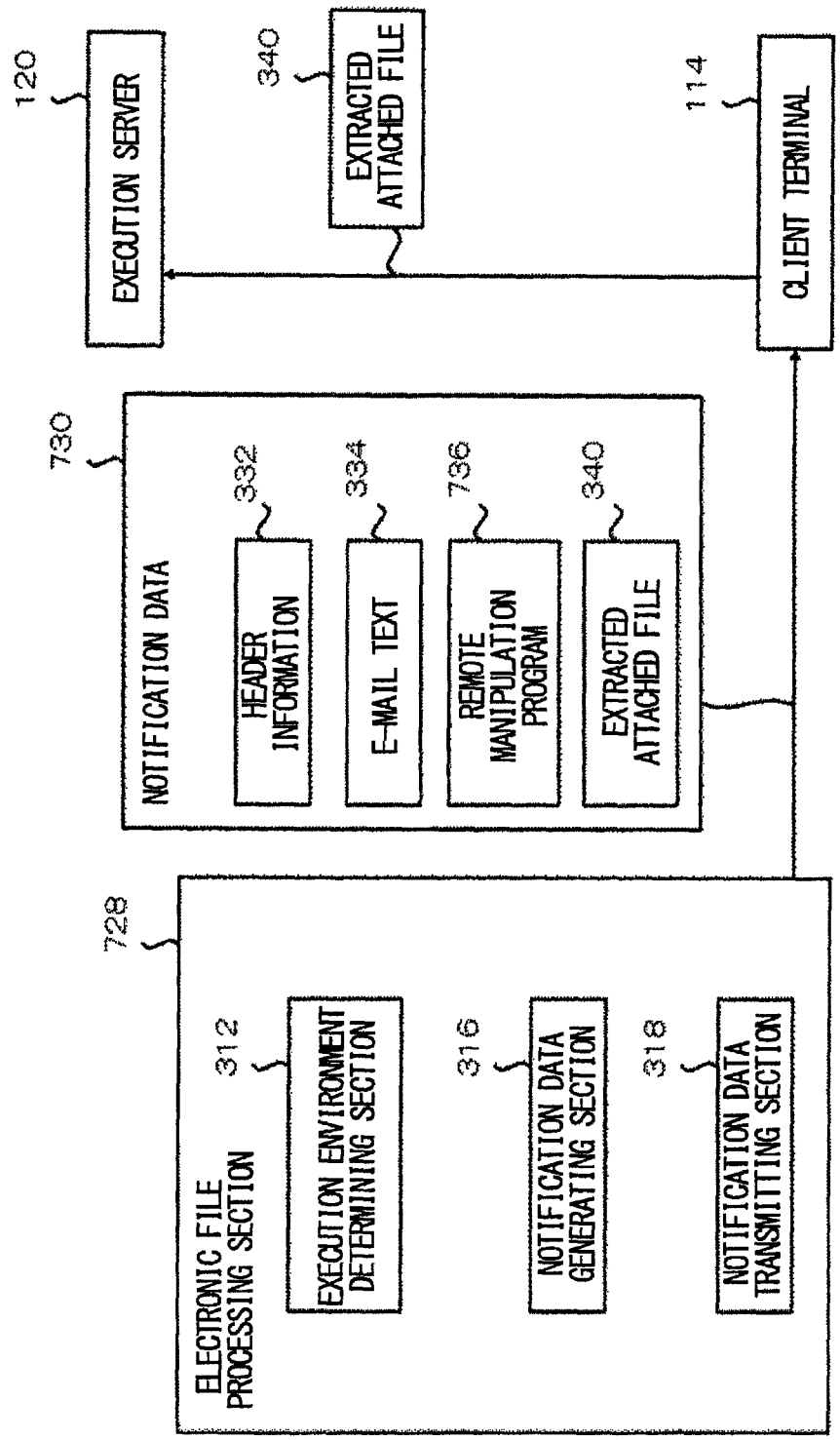
FIG. 7 schematically shows an example of an electronic file processing section 728.

FIG. 7 schematically shows an example of an electronic file processing section 728. The electronic file processing section 728 is different from the electronic file processing section 228 in that the electronic file transmitting section 314 is omitted and that the notification data generating section 316 generates notification data 730 including the attached file 340 and a remote manipulation program 736. The electronic file processing section 728 may be the same as the electronic file processing section 228 except for the above-described differences.

In the present embodiment, the notification data generating section 316 generates a remote manipulation program 736 to remotely manipulate the execution environment determined by the execution environment determining section 312. The notification data generating section 316 may be an exemplary remote manipulation program generating section. In one embodiment, the remote manipulation program 736 may include destination identification data identifying the destination of the attached file 340 or the converted attached file 340 and execution environment identification data identifying the execution environment in which the attached file 340 is to be executed. The remote manipulation program 736 may be exemplary information regarding the access to the attached file 340. The remote manipulation program 736 may be an example of at least one of the destination identification data and the execution environment identification data. In a different embodiment, the e-mail text 334 may include the destination identification data and the execution environment identification data, and the remote manipulation program 736 may obtain the destination identification data and the execution environment identification data included in the e-mail text 334 when executed.

The remote manipulation program 736 may be designed to cause a computer to perform a procedure of establishing a communication path between the computer and the virtual server 412. The communication path may be designed to allow the computer executing the remote manipulation program to remotely manipulate a different computer storing thereon the attached file or the converted attached file. The remote manipulation program 736 may be designed to cause the computer to further perform a procedure of transmitting to the execution environment via the communication path enabling remote manipulation an execution instruction to instruct the client terminal 114 to execute the attached file 340 thereon.

The remote manipulation program 736 may be designed to cause the computer to further perform a procedure of transmitting the attached file 340 or the converted attached file 340 from the computer to the virtual server 412 via the network 10. In this manner, when the remote manipulation program 736 is executed on the client terminal 114, the client terminal 114 can transfer the attached file 340 included in the notification data 730 to the virtual server 412.

The notification data generating section 316 generates the notification data 730. In the present embodiment, the notification data 730 includes the header information 332, the e-mail text 334, the attached file 340, and the remote manipulation program 736. Here, the e-mail text 334 and the attached file 340 may form a different electronic file than the remote manipulation program 736, and the remote manipulation program 736 may be an electronic file including at least one of the e-mail text 334 and the attached file 340.

The notification data 730 may be an exemplary data structure. The notification data 730 may be an exemplary data structure stored on the client terminal 114 or the other terminal 20. For example, the notification data 730 may be a data structure including the data of the attached file 340, the destination identification data identifying the destination of the attached file 340, the execution environment identification data identifying the virtual server 412 in which the attached file 340 is to be executed, and the program to cause one of the client terminal 114 and the other terminal 20 to perform a procedure of transmitting the data of the attached file 340 or the converted attached file 340 to the destination identified by the destination identification data and a procedure of establishing a communication path enabling remote manipulation between one of the client terminal 114 and the other terminal 20 and the virtual server 412 identified by the execution environment identification data. The client terminal 114 or the other terminal 20 may be an exemplary first computer. The virtual server 412 may be an exemplary second computer.

In the present embodiment, a case where the attached file 340 is transferred to the execution server 120 via the client terminal 114 is described. However, the electronic file to be transferred is not limited to the attached file 340. The converted attached file 340 may be transferred to the execution server 120 via the client terminal 114.

Figure 8:
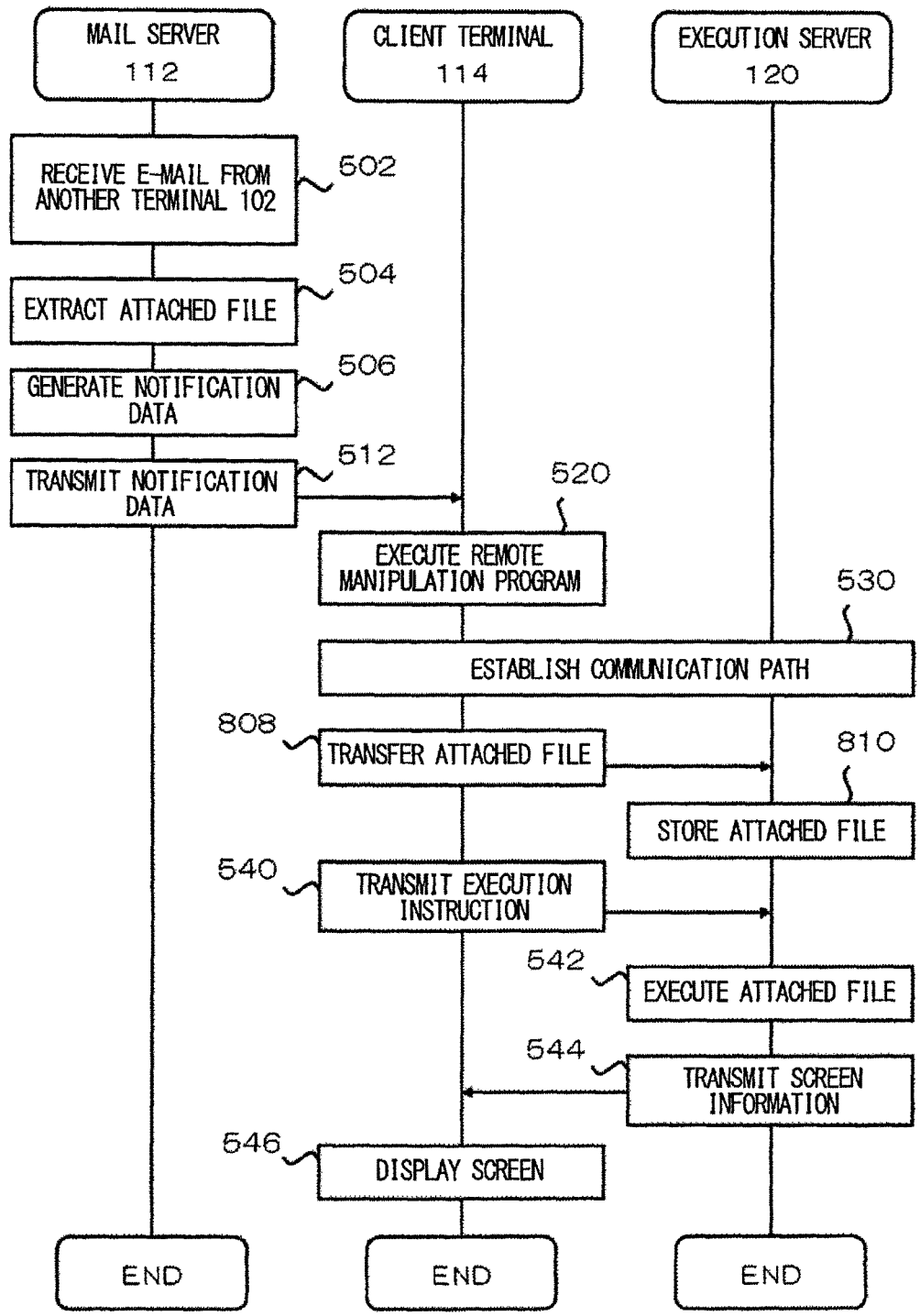
FIG. 8 schematically shows an exemplary process performed in the file transfer system 100.

FIG. 8 schematically shows an exemplary operation performed in the file transfer system 100 including the electronic file processing section 728. FIG. 8 schematically shows an exemplary operation performed when the mail server 112 receives an e-mail addressed to the client terminal 114 from the other terminal 20. The operation shown in FIG. 8 is different from the operation shown in FIG. 5 in that the steps S508 and S510 are replaced with steps S808 and S810. The operation shown in FIG. 8 may be the same as the operation shown in FIG. 5 except for the above-described differences.

In S808, the remote manipulation section 244 extracts the attached file 340 contained in the notification data 730. The remote manipulation section 244 transmits the attached file 340 to the execution server 120. In S810, the electronic file storing section 426 stores thereon the attached file 340.

In the present embodiment, a case where the steps S808 and S810 are performed after the step S530 is described. However, the timing at which the steps S808 and S810 are performed is not limited to the present embodiment. In a different embodiment, the steps S808 and S810 may be performed subsequent to the step S520 and prior to the step S530.

Figure 9:
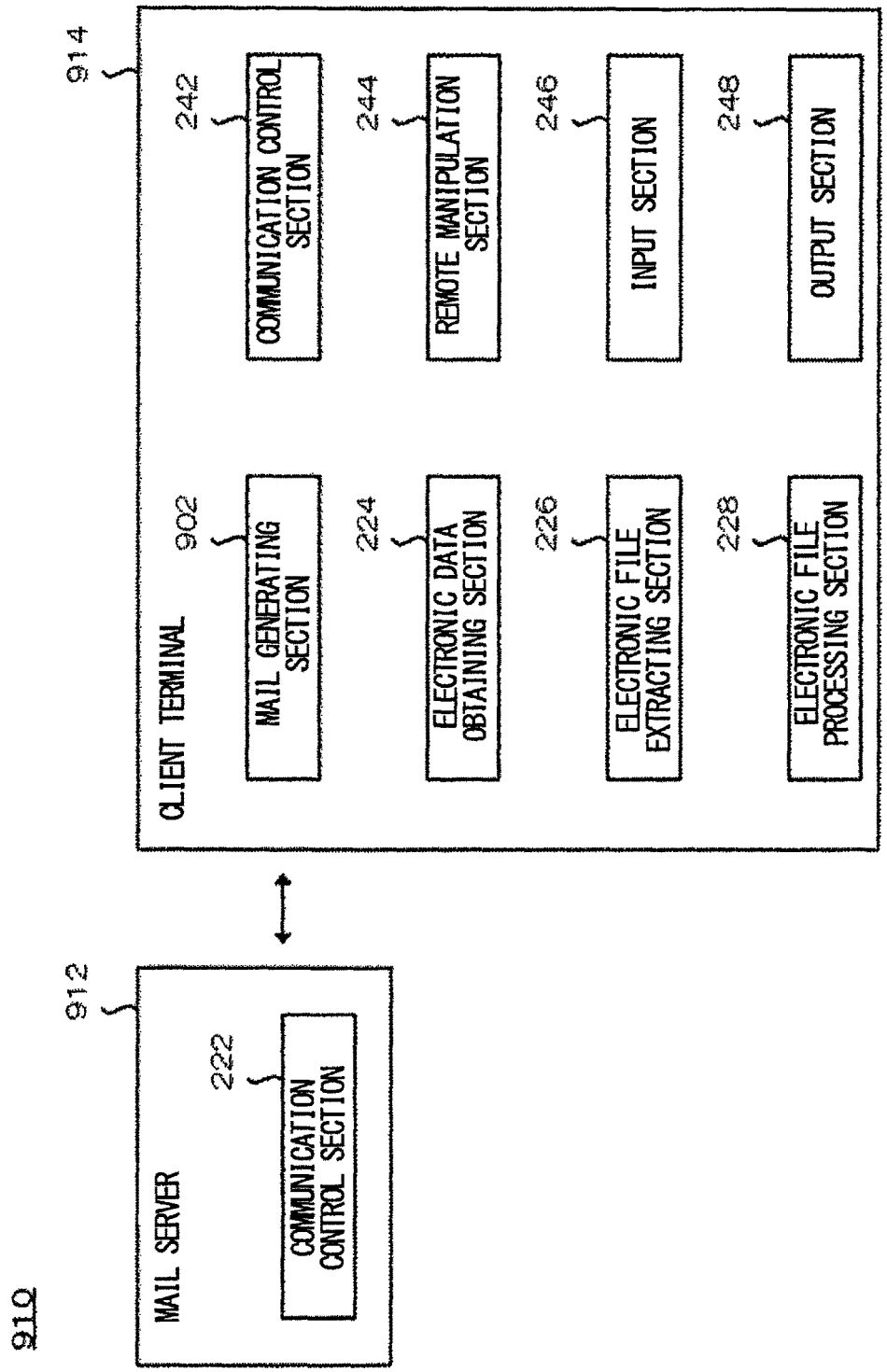
FIG. 9 schematically shows an example of a mail system 910.

FIG. 9 schematically shows an example of a mail system 910. The mail system 910 includes a mail server 912 and a client terminal 914. The client terminal 914 may include a mail generating section 902 for generating an e-mail. The mail system 910 is different from the mail system 110 in that the electronic data obtaining section 224, the electronic file extracting section 226 and the electronic file processing section 228 are arranged not on the mail server 912 but on the client terminal 914. The mail system 910 may have the same structure as the mail system 110 except for the above-described differences.

In the present embodiment, a case where the client terminal 914 includes the electronic file processing section 228 is described. However, the client terminal 914 is not limited to the present embodiment. The client terminal 914 may include the electronic file processing section 728 in place of the electronic file processing section 228. In addition, the electronic file processing section 228 may not include the notification data transmitting section 318, and the notification data transmitting section 318 may transmit the notification data 330 or the notification data 730 to the mail generating section 902.

In one embodiment, the electronic file processing section 228 may detect execution of an electronic file on the client terminal 914. The electronic file processing section 228 may detect an electronic file stored on the client terminal 914 being executed on the client terminal 914, or may detect an electronic file stored on an external storage device connected to the client terminal 914 being executed on the client terminal 914. The external storage device can be, for example, a semiconductor storage device such as an USB memory or an SB memory, a storage medium such as CD, DVD or BD, an information processing apparatus connected to the client terminal 914 via a network and the like.

The electronic file processing section 228 may detect execution of a predetermined electronic file in the client terminal 914. The electronic file processing section 228 may detect execution of a predetermined electronic file based on the file format or extension of the electronic file, or may detect execution of a predetermined electronic file based on a list of predetermined electronic files.

If execution of an electronic file is detected, the electronic file processing section 228 causes an execution processing section of an OS to stop the execution of the electronic file. Also, the electronic file processing section 228 transmits the electronic file that has been detected as being executed to the execution server 120. Subsequently, the electronic file processing section 228 activates the remote manipulation section 244 to establish a communication path enabling remote manipulation with the execution server 120 and executes the electronic file on the execution server 120.

Figure 10:
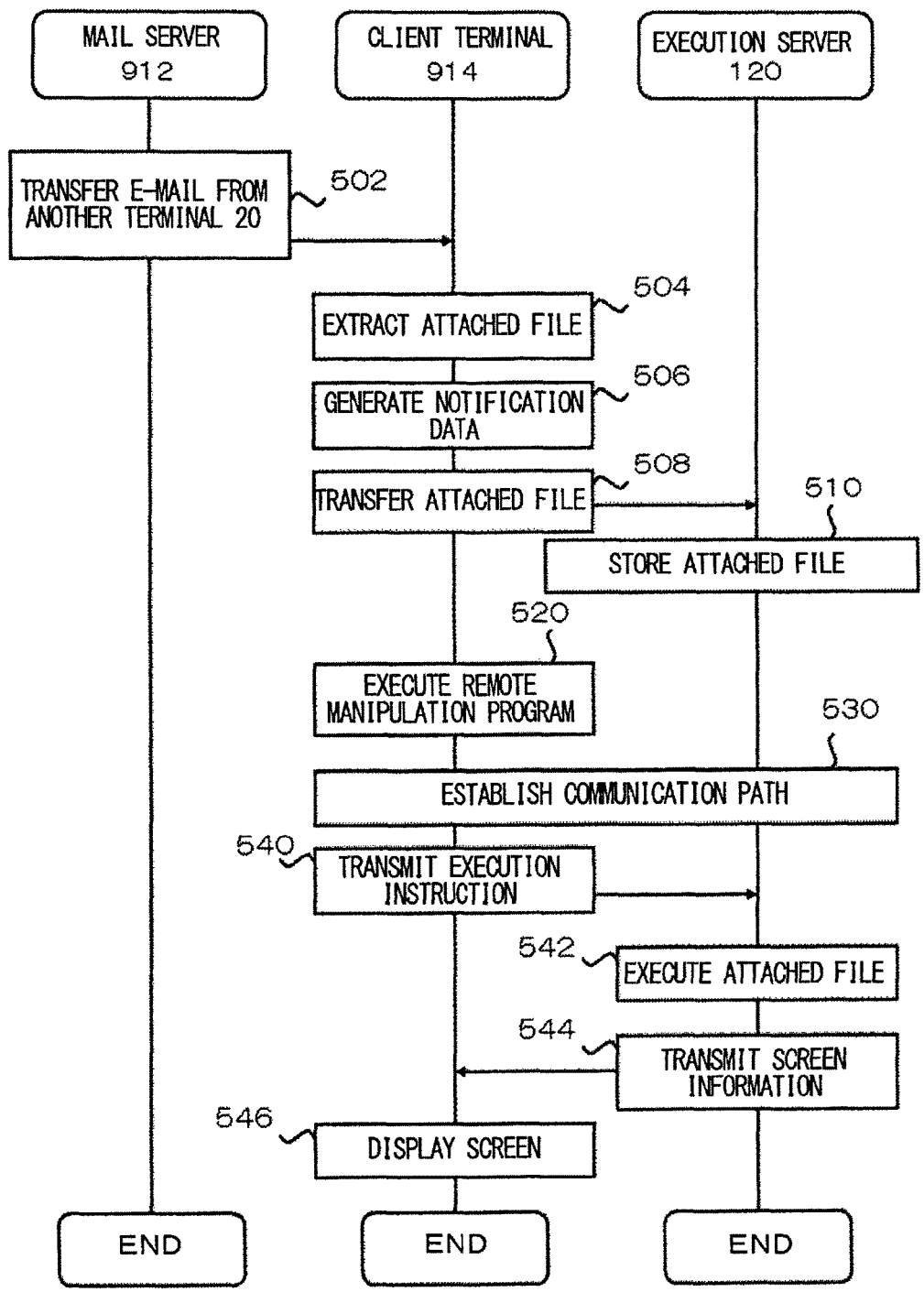
FIG. 10 schematically shows an exemplary process performed in the file transfer system 100.

FIG. 10 schematically shows an exemplary operation performed in the file transfer system 100 including the mail system 910. FIG. 10 schematically shows an exemplary operation performed when the mail server 112 receives an e-mail addressed to the client terminal 114 from the other terminal 20.

The operation shown in FIG. 10 is different from the operation shown in FIG. 5 in that the e-mail from the other terminal 20 is transmitted to the client terminal 114 from the mail server 112 in S502, that the steps S504, S506 and S508 are performed at the client terminal 114 and that the step S512 is omitted. The operation shown in FIG. 10 may be the same as the operation shown in FIG. 5 except for the above-described differences.

Figure 11:
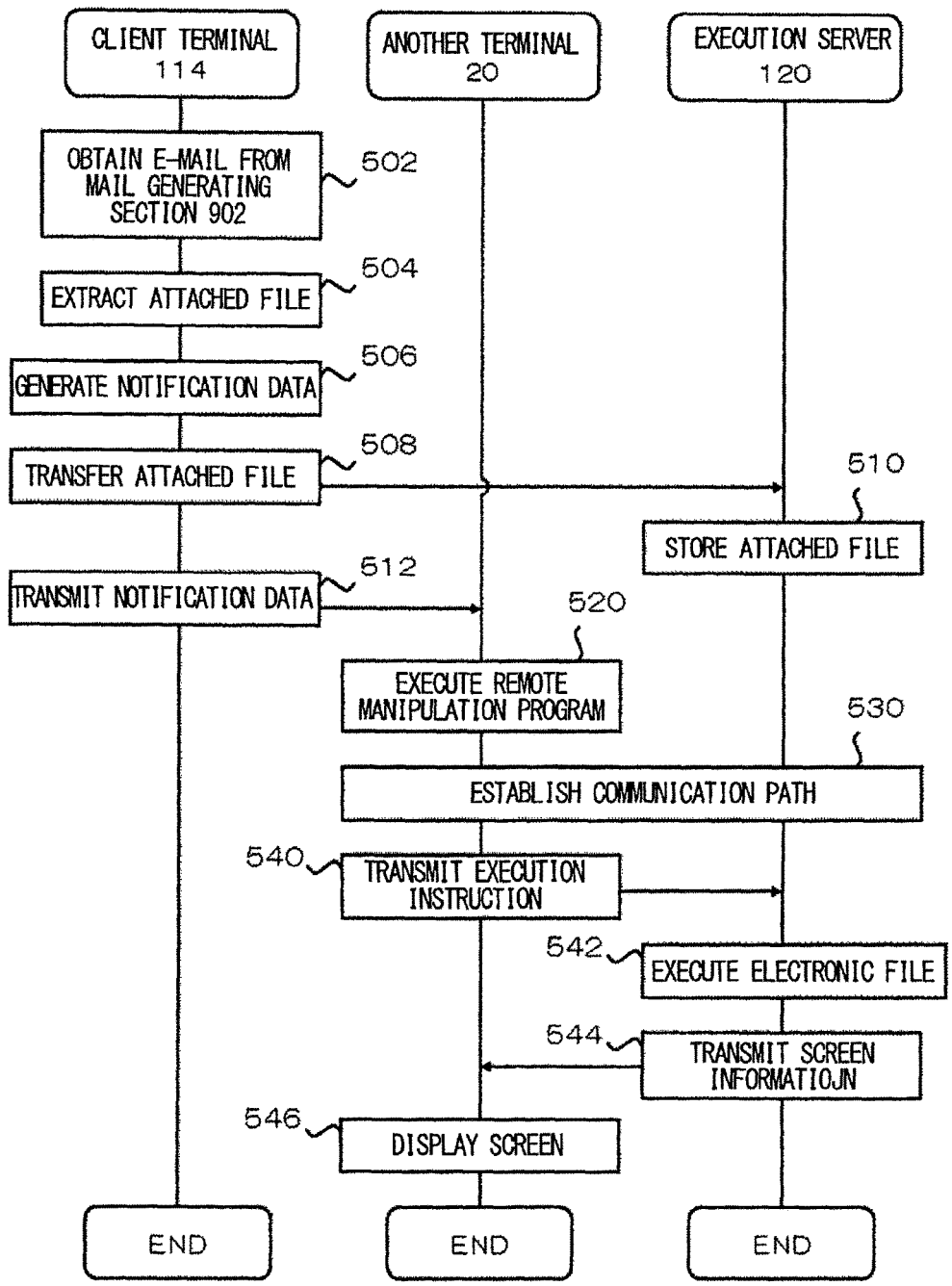
FIG. 11 schematically shows an exemplary process performed in the file transfer system 100.

FIG. 11 schematically shows an exemplary operation performed in the file transfer system 100 including the mail system 910. FIG. 11 schematically shows an exemplary operation performed when the mail server 112 receives an e-mail addressed to the other terminal 20 from the client terminal 114.

The operation shown in FIG. 11 is different from the operation shown in FIG. 6 in that the steps S502, S504, S506, S508 and S512 are performed at the client terminal 114 and that the electronic data obtaining section 224 of the client terminal 114 obtains the e-mail from the mail generating section 902 in S502. The operation shown in FIG. 11 may be the same as the operation shown in FIG. 6 except for the above-described differences.

Figure 12:
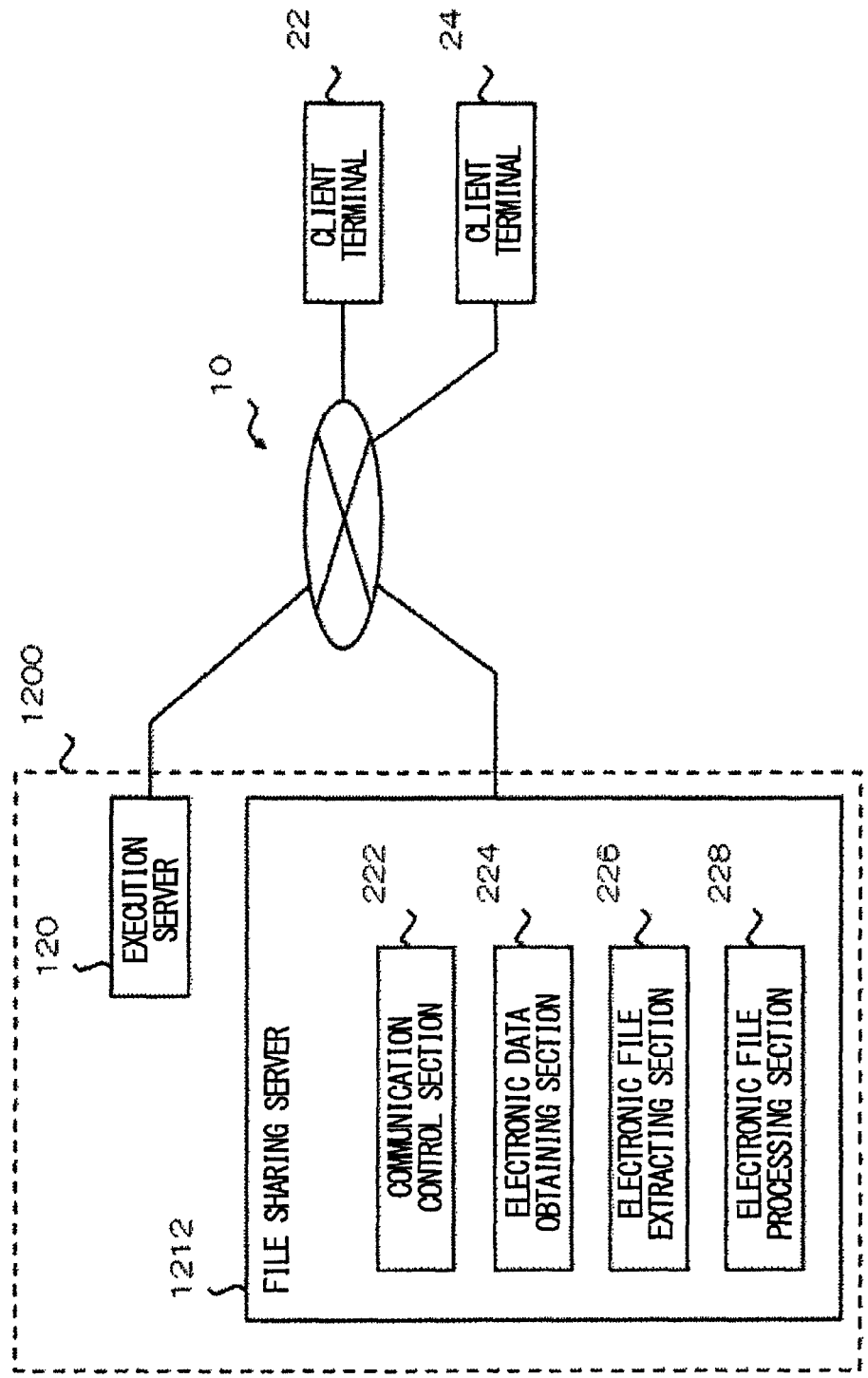
FIG. 12 schematically shows an example of a file transfer system 1200.

FIG. 12 schematically shows an example of a file transfer system 1200. The file transfer system 1200 includes the execution server 120 and a file sharing server 1212. The file sharing server 1212 includes the communication control section 222, the electronic data obtaining section 224, the electronic file extracting section 226 and the electronic file processing section 228.

The file transfer system 1200 is different from the file transfer system 100 in that the mail system 110 is replaced with the file sharing server 1212 and that the file transfer system 1200 exchanges information with the client terminals 22 and 24 via the network 10. The file transfer system 1200 may have the same structure as the file transfer system 100 except for the above-described differences. The client terminals 22 and 24 may have the same structure as the client terminal 114 or the other terminal 20. The file transfer system 1200 can allow the client terminals 22 and 24 to safely share an electronic file.

The file transfer system 1200 may restrict the types of manipulations that can be performed on the attached file 340 on the execution server 120. The file transfer system 1200 may store restriction information thereon in which user identification information identifying an authorized user of an electronic file is associated with an allowed or banned manipulation for the authorized user. The user identification information identifying an authorized user of an electronic file may be information indicating a user that is identified when the electronic file is uploaded. The allowed or banned manipulation can be, for example, viewing, printing, editing, copying, moving, and transmitting the electronic file, copying the contents of the electronic file onto a clipboard, capturing the screen and the like.

The restriction information may be information in which electronic file identification information identifying an electronic file is associated with an allowed or banned manipulation for the electronic file. The restriction information may be information in which the user identification information, the electronic file identification information and the allowed or banned manipulation for the electronic file or the user are associated with each other. When an electronic file is encrypted, the restriction information may further include a passcode used to decrypt the electronic file in association with the user identification information or the electronic file identification information.

The file transfer system 1200 may determine whether to respond to a user's instruction based on the restriction information. For example, when the file transfer system 1200 receives a user's instruction for a particular electronic file from the user of the client terminal 22, the file transfer system 1200 refers to the restriction information and accordingly determines whether the manipulation indicated by the user's instruction is allowed or banned for the user or for the electronic file. In this way, the manipulation of the electronic file can be restricted.

The communication control section 222 may have a firewall function. The communication control section 222 may set a firewall so that information stored on the file sharing server 1212 cannot be directly accessed from outside the file transfer system 1200. The communication control section 222 may set an access right for each client terminal 114 or for each user of the client terminal 114.

The communication control section 222 may realize the firewall function by an application program or realize the firewall function by an OS. The communication control section 222 may set an appropriate firewall by changing settings of the firewall function provided by the OS.

When having received a request instructing transmission of electronic data or an electronic file to the outside of the file sharing server 1212, the communication control section 222 may receive the request if the request is from the virtual server managing section 410 of the execution server 120. On the other hand, if the request is not from the virtual server managing section 410 of the execution server 120, it may not receive the request.

The file sharing server 1212 may be constituted with a single server or may be constituted with a plurality of servers. The execution server 120 can take out a desired file even if the file sharing server 1212 is constituted with a plurality of servers.

The file sharing server 1212 has stored thereon an electronic file shared between the client terminal 22 and the client terminal 24. The file sharing server 1212 may store an electronic file in association with user information as data which is the same as the user information and the electronic file, or may store the user information and the electronic file separately. The user information may be a unique SID to be used in Windows (registered trademark). The unique SID may be a login ID, a combination of a domain name and a user name, or a unique ID that is given by an application program, and that is to be used for identification of a user by the application program.

Figure 13:
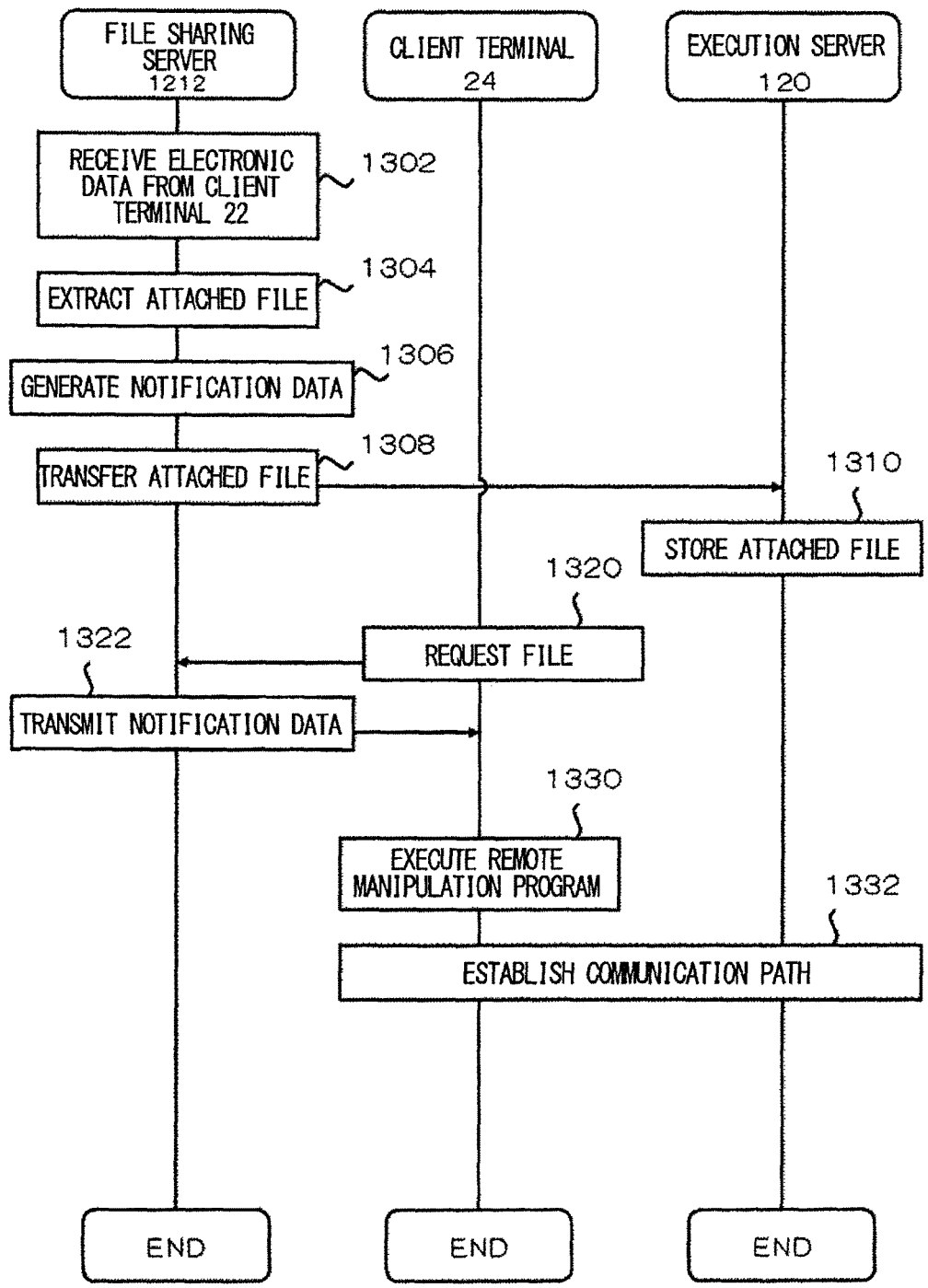
FIG. 13 schematically shows an exemplary process performed in the file transfer system 1200.

FIG. 13 schematically shows an exemplary operation performed in the file transfer system 1200. FIG. 13 schematically shows an exemplary operation performed when the data that has been uploaded by the client terminal 22 to the file sharing server 1212 is viewed from the client terminal 24.

In S1302, the electronic data obtaining section 224 obtains electronic data uploaded by the client terminal 22. In S1304, the electronic file extracting section 226 extracts an electronic file from the uploaded electronic data. In S1306, the notification data generating section 316 generates notification data. In S1308, the electronic file transmitting section 314 transmits the electronic file to the virtual server 412. In S1310, the electronic file storing section 426 stores thereon the electronic file.

In S1320, the client terminal 24 issues a request to view or download the electronic file to the file sharing server 1212. In S1322, the notification data transmitting section 318 transmits the notification data to the client terminal 24.

The user of the client terminal 24 checks the notification data on the client terminal 24. In S1330, when the user desires to view or download the electronic file, the user executes the remote manipulation program on the client terminal 24. In S1332, the remote manipulation section 244 establishes a communication path enabling remote manipulation between the client terminal 24 and the execution server 120. The subsequent steps are the same as in the operation shown in FIG. 5 and the like.

In the present embodiment, a case where the file transfer system 100 and the file transfer system 1200 are used for the purposes of preventing virus infection is described. However, the purpose of using the file transfer systems 100 and 1200 is not limited to the prevention of virus infection.

In a different embodiment, the file transfer system 100 or 1200 may be used for the purposes of transmitting an electronic file irrespective of the settings of the destination of the electronic file. In a further different embodiment, the file transfer system 100 or 1200 may be used for the purposes of allowing an electronic file to be viewed irrespective of the environment of the destination of the electronic file.

Figure 14:
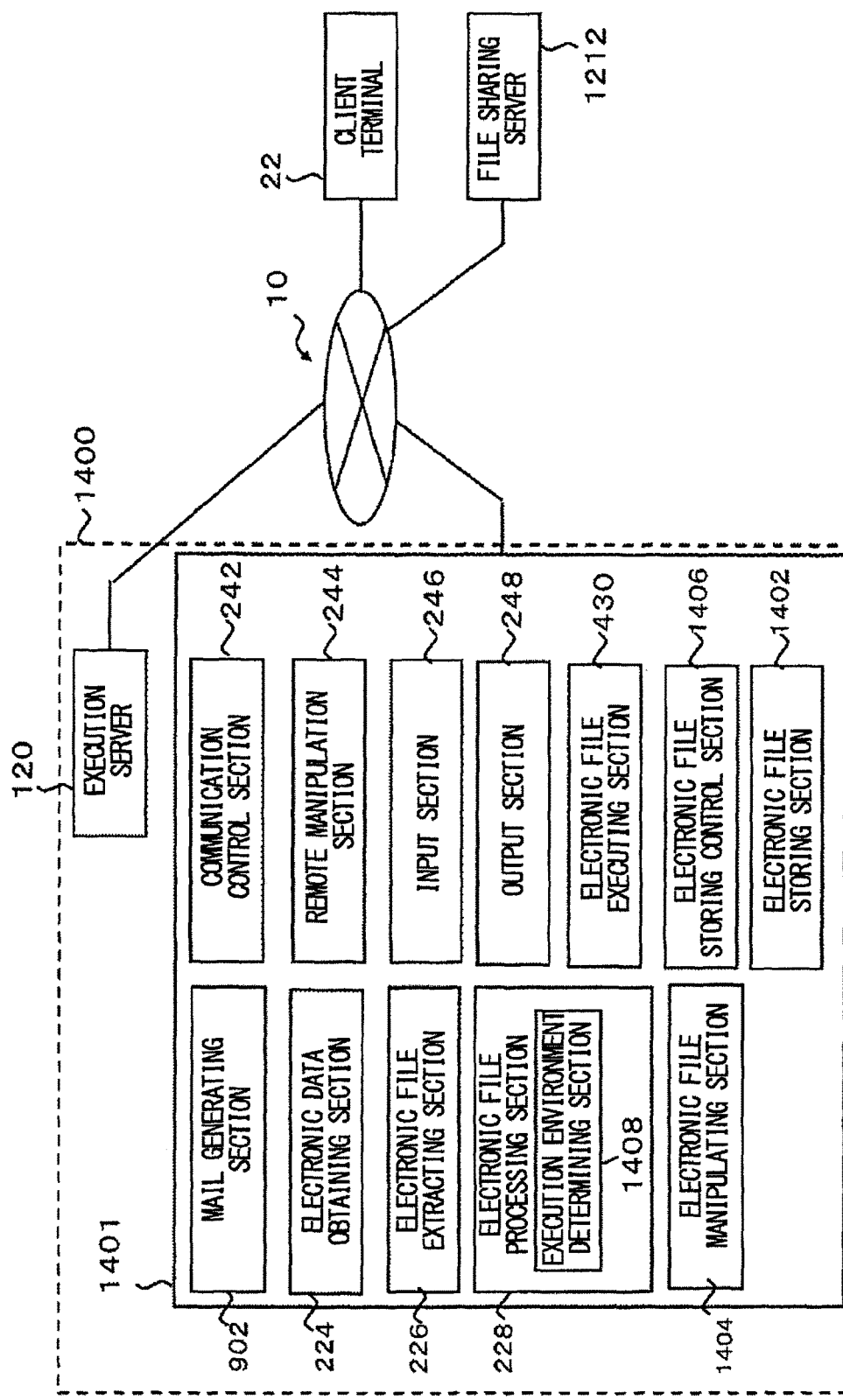
FIG. 14 schematically shows an example of a file processing system 1400.

FIG. 14 schematically shows an example of a file processing system 1400. The file processing system 1400 includes the execution server 120, the file sharing server 1212, and a client terminal 1401. In the present embodiment, the client terminal 1401 includes, in addition to the constituents of the client terminal 914 shown in FIG. 9, an electronic file storing section 1402, an electronic file manipulating section 1404, an electronic file storing control section 1406, and an electronic file executing section 430. The execution server 120 has the same structure as the execution server described with reference to FIG. 4.

According to the embodiment described with reference to FIGS. 1, 9 and 12, a client terminal or a file transfer system receives an execution instruction to instruct the client terminal or the file transfer system to execute an electronic file, and the electronic file is executed on an execution server. According to the present embodiment, the file processing system 1400 receives an instruction about manipulation of an electronic file, and manipulation corresponding to the instruction is executed on the execution server 120. For example, when a user performs manipulation of viewing, editing or the like on an electronic file stored on the client terminal 1401, after a communication path is established between the client terminal 1401 and the execution server 120, the electronic file that has become a target of the manipulation is transferred from the client terminal 1401 to the execution server 120, and processing on the electronic file is executed on a virtual server.

The electronic file storing section 1402 stores thereon an electronic file. In the present example, the electronic file storing section 1402 stores thereon the electronic file received from the file sharing server 1212. The electronic file manipulating section 1404 obtains, for example, an instruction from a user about manipulation of an electronic file. Here, the manipulation of an electronic file may mean an attempt to open the electronic file using a predetermined application, moving, copying and printing the electronic file, converting the file format of the electronic file, copying the contents of the electronic file onto a clipboard, capturing the screen and the like.

The electronic file processing section 228 includes an execution environment determining section 1408. The execution environment determining section 1408 may determine the execution environment in which the electronic file is remotely manipulated to be executed, based on the format, extension or name of the electronic file, or the login ID of the client terminal 1401. The virtual servers 412-416 included in the execution server 120 are each an exemplary execution environment. In response to a user's instruction, the client terminal 1401 transfers the electronic file to the execution server 120 so that the electronic file is remotely manipulated on the virtual server in the execution server 120. The user's instruction may be an exemplary execution instruction for executing manipulation of an electronic file in an execution environment. In this way, processing corresponding to manipulation of an electronic file is executed in an execution environment. In the present embodiment, manipulation of an electronic file indicated in a user's instruction is not executed on the client terminal 1401.

The electronic file storing control section 1406 controls whether to store the remotely manipulated electronic file onto the electronic file storing section 1402. The electronic file storing control section 1406 may automatically obtain from the execution server 120 the electronic file that has been remotely manipulated on the execution server 120 and store the remotely manipulated electronic file onto the electronic file storing section 1402, or store the remotely manipulated electronic file onto the electronic file storing section 1402 in response to a user's instruction. The electronic file storing control section 1406 may store a remotely manipulated electronic file on the execution server 120. The electronic file storing control section 1406 may convert the file format or extension of a remotely manipulated electronic file in the execution server 120. For example, the electronic file storing control section 1406 adds a predetermined character string to the extension of an electronic file obtained from the execution server 120.

The electronic file storing control section 1406 may allow the user to choose in advance whether to store the electronic file automatically or in response to the user's instruction. Thus, once the user performs some manipulation again on the electronic file stored on the electronic file storing section 1402, the execution environment determining section 1408 again determines the execution environment in which the electronic file is to be executed.

According to the above-described configuration, when the user manipulates, for example, views the electronic file, the electronic file is actually manipulated on the virtual server on the execution server 120, not on the client terminal 1401. Thus, even when the electronic file is infected with a virus, the client terminal 1401 can be prevented from being infected with the virus while the electronic file can still be manipulated.

In the present embodiment, the execution environment determining section 1408 may determine whether the electronic file is remotely manipulated to be executed on the execution server 120 or executed on the client terminal 1401. The execution environment determining section 1408 may make the determination based on the format, extension or name of the electronic file. The execution environment determining section 1408 may allow the electronic file to be executed on the virtual server when the electronic file has a predetermined format, extension or name, and may allow the electronic file to be executed by the electronic file executing section 430 when the electronic file does not have a predetermined format, extension or name.

The execution environment determining section 1408 may include means to allow a user to choose whether to choose an execution environment. For example, the execution environment determining section 1408 causes a screen for allowing a user to choose either the execution server 120 or the client terminal 1401 to be displayed on a display device of the output section 248. The execution environment determining section 1408 may receive choice results of users and save them as user settings for each user. The execution environment determining section 1408 may choose an execution environment based on user settings.

For example, when the execution environment determining section 1408 determines to execute an electronic file on the electronic file executing section 430, the electronic file executing section 430 executes the electronic file. In this way, more convenience can be provided to the user.

The execution environment determining section 1408 may obtain information regarding an execution environment when a user has manipulated an electronic file stored on the client terminal 1401. When an operation corresponding to manipulation of an electronic file is to be executed on the execution server 120, the information regarding the execution environment can be, for example, information identifying a server to be the execution environment, an expiration limit of the server, a user ID of a user of the file transfer system 100 or the client terminal 114 in the server, a password associated with the user ID and the like.

In the present embodiment, the case where the client terminal 1401 stores, in advance, an electronic file obtained from the file sharing server 1212 in a storage device of the client terminal 1401, and manipulates the electronic file on the execution server 120 based on an instruction from a user about manipulation of the electronic file is described. However, the file processing system 1400 is not limited to the present embodiment.

In a different embodiment, when having received an instruction from a user about manipulation of an electronic file stored on the file sharing server 1212, the client terminal 1401 may request the file sharing server 1212 to transfer the electronic file to the execution server 120. The file sharing server 1212 may transfer the electronic file to the execution server 120 via at least any one of the communication control section 242, the remote manipulation section 244, the electronic file processing section 228 and the electronic file manipulating section 1404 of the client terminal 1401. Also, the client terminal 1401 may establish a communication path enabling remote manipulation between the client terminal 1401 and the execution server 120 by using a protocol such as the RDP, and transmit, to the execution server 120, an instruction for executing manipulation corresponding to an instruction from a user on an electronic file transferred from the file sharing server 1212.

In the present embodiment, the case where the electronic file storing control section 1406 stores a remotely manipulated electronic file on the electronic file storing section 1402 of the client terminal 1401 is described. However, the file processing system 1400 is not limited to the present embodiment. In a different embodiment, the electronic file storing control section 1406 may store a remotely manipulated electronic file on the file sharing server 1212. Also, in the present embodiment, the case where the client terminal 1401 has the electronic file storing control section 1406 and the execution environment determining section 1408 is described. However, the file processing system 1400 is not limited to the present embodiment. In a different embodiment, the execution server 120 may have at least one of the electronic file storing control section 1406 and the execution environment determining section 1408. In a further different embodiment, the function of the client terminal 1401 may be realized by the file sharing server 1212.

Figure 15A:
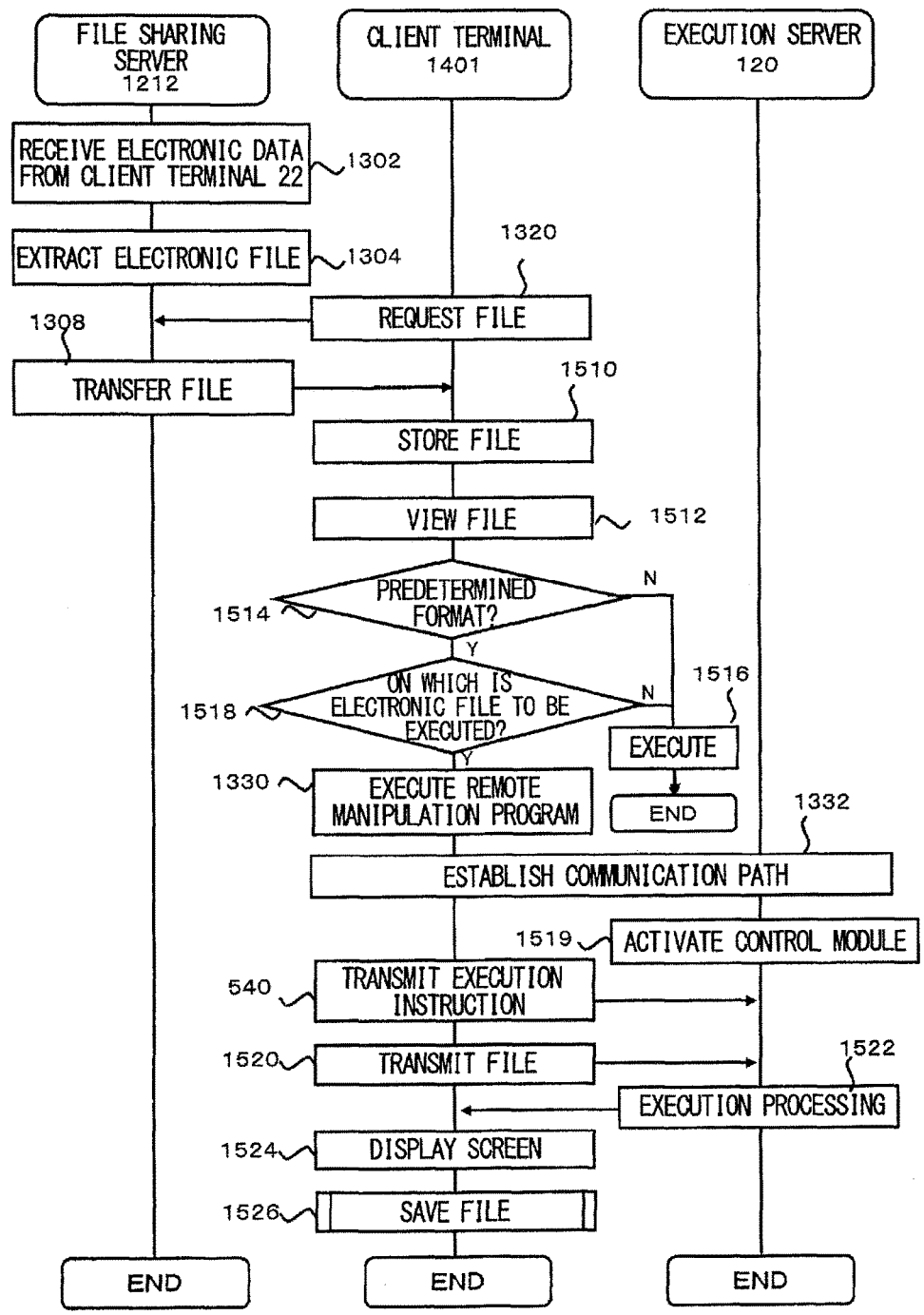
FIG. 15A schematically shows an exemplary process performed in the file processing system 1400.

FIG. 15A schematically shows an exemplary operation performed in the file processing system 1400. In the present example, FIG. 15A schematically shows an exemplary operation performed when the data that has been uploaded onto the file sharing server 1212 by the client terminal 22 is downloaded and stored onto the client terminal 1401 and the electronic file is then viewed. Note that the steps assigned with the same reference numerals as in FIG. 13 may be the same as the corresponding steps shown in FIG. 13.

In S1304, the file sharing server 1212 extracts the electronic file from the received electronic data, and transfers the extracted file to the client terminal (S1308) in response to a request from the client terminal 1401 (S1320). In S1510, the electronic file storing section 1402 stores thereon the electronic file transferred from the file sharing server 1212. In S1512, the electronic file manipulating section 1404 opens the file to view the file in response to the user's instruction.

In S1514, the execution environment determining section 1408 checks whether the electronic file has a predetermined format, extension or name. When the electronic file does not have a predetermined format, extension or name (S1514: NO), the electronic file executing section 430 executes the electronic file (S1516). When the electronic file has a predetermined format, extension or name (S1514: YES), the execution environment determining section 1408 allows the user to choose whether the electronic file is to be executed on the execution server 120 or on the client terminal 1401, for example, by displaying a dialog (S1518). When the user chooses the execution at the client terminal 1401 (S1518: NO), the electronic file executing section 430 executes the electronic file (S1516). When the user chooses the execution at the execution server 120 (S1518: YES), the remote manipulation program is executed on the client terminal 1401 (S1330).

A communication path is established as a result of the execution of the remote manipulation program (S1332). To be specific, for example, the client terminal 1401 connects to a virtual host server of the execution server 120 and obtains information regarding a virtual guest server to be connected. The virtual host server may be the virtual server managing section 410.

The virtual guest server may be the virtual server 414 or the virtual server 416. The information regarding the virtual guest server to be connected may be exemplary information regarding the execution environment.

The execution server 120 determines a protocol such as TCP or UDP to be used based on the type of an electronic file, the extension of an electronic file, URI, URL, URN or the like. The execution server 120 opens a particular port based on a protocol determined (may be referred to as "open a port"). After this, the client terminal 1401 specifies the particular port and connects to a virtual guest server by using a protocol such as the RDP.

Triggered by connection that uses a protocol such as the RDP, a control module for controlling an application for executing an electronic file is activated (S1519). The control module may be activated in advance. Also, the processing of opening a port may be executed by the control module. After this, when the electronic file transmitting section 314 included in the electronic file processing section 228 transmits the electronic file (S1520), the application managed by the control module executes the electronic file (S1522).

Image data of a screen showing that the electronic file is being processed is transmitted to the client terminal 1401 by using a remote manipulation technology such as the RDP, and the display screen is displayed on the output section 248 of the client terminal 1702 (S1524). The client terminal 1401 may execute transfer of electronic data or an electronic file or transmission and reception of a command on an execution environment of the execution server 120 via a communication path enabling remote manipulation. The client terminal 1401 may execute saving and/or overwriting and saving or the like of electronic data or an electronic file on an execution environment of the execution server 120 via a communication path enabling remote manipulation (S1522).

Upon termination of processing or manipulation of electronic data or when a user manipulates the client terminal 1702, an application such as a web browser in operation on an execution environment of the execution server 120 is terminated. When the execution server 120 receives an instruction for terminating a web browser, the communication control section 1706 closes a port that is open. The execution server 120 may close a port without receiving an instruction from the client terminal 1702, but when termination of processing or manipulation of electronic data has been detected. For example, when having not been able to communicate with the client terminal 1702 or a network for a certain length of time, the execution server 120 detects termination of processing or manipulation of electronic data. The control module may execute processing of detecting termination of processing or manipulation of electronic data, and processing of closing a port.

When the remote manipulation is terminated, the processing in the execution environment is accordingly terminated. After this, if necessary, the electronic file storing section 1402 of the client terminal 1401 saves the electronic file (S1526).

Here, the step S1518 can be omitted. Alternatively, the execution environment determining section 1408 may allow the user to choose whether the dialog is to be displayed. In the step S1522 described above, when the electronic file is received, the control module may determine whether the received electronic file can be executed in the execution environment.

When the control module determines that the electronic file cannot be executed for such a reason that no application is present that is capable of executing the electronic file, the electronic file processing section 228 may cause the determination to be displayed on the screen of the file processing system 1400. In this case, the client terminal 1401 may further display a screen to allow the user to check whether the electronic file is to be executed by the electronic file executing section 430. According to the above description of S1518, the control module is activated when the connection is completed using a protocol such as the RDP. However, the control module may remain activated since the virtual server is activated.

Figure 15B:
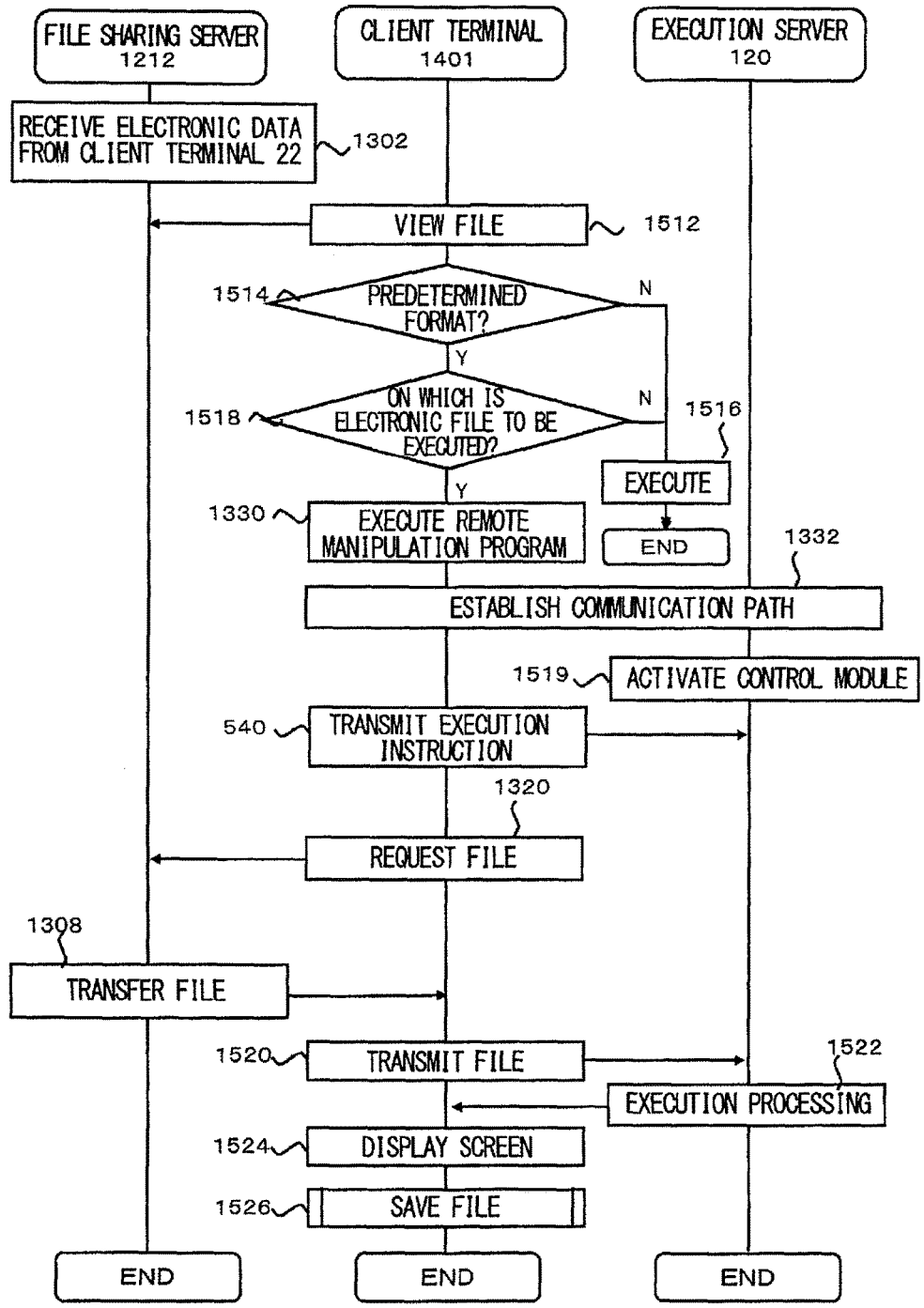
FIG. 15B schematically shows another exemplary process performed in the file processing system 1400.

FIG. 15B schematically shows another exemplary operation performed in the file processing system 1400. In the present example, the electronic data that has been uploaded by the client terminal 22 onto the file sharing server 1212 can be viewed without being stored on the client terminal 1401. To be more specific, in response to a view request from the client terminal 1401 (S1512), the remote manipulation program is executed (S1330). After the communication path is then established, a request for the electronic file is issued from the client terminal 1401 to the file sharing server 1212 (S1320).

In response to this request, the file sharing server 1212 transfers the electronic file to the execution server 120 (S1308), the client terminal 1401 transmits the transferred electronic file to the execution server 120 (S1520). Subsequently, the electronic file is processed at the execution server 120 (S1522) so that the electronic file can be viewed on the client terminal 1401 (S1524). After this, if necessary, the electronic data is saved on the client terminal 1401.

Note that the steps assigned with the same reference numerals as in FIG. 15A may be the same as the corresponding steps shown in FIG. 15A. While FIG. 15B shows that the electronic file is transferred to the execution server 120 via the client terminal 1401, the file sharing server may directly transfer the electronic file to the execution server 120 without going through the client terminal 1401.

Figure 16:
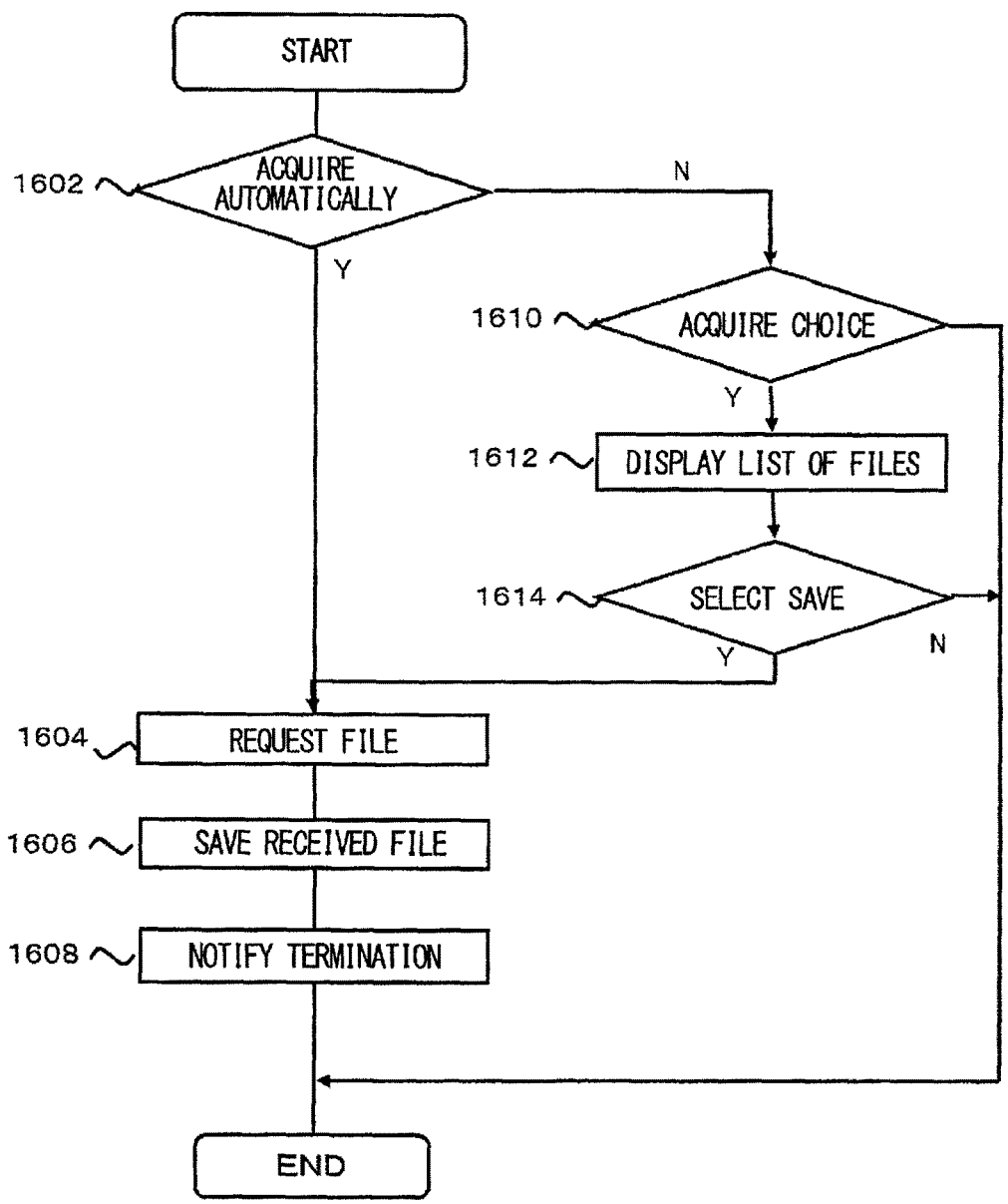
FIG. 16 schematically shows an example of a file saving process performed in the file processing system 1400.

FIG. 16 schematically shows an exemplary operation performed in the step S1526. In the present example, the electronic file storing control section 1406 allows the user to choose in advance whether to automatically save the electronic file. The electronic file storing control section 1406 allows the user to choose in advance, in a case where the user has chosen not to automatically save the electronic file, whether to allow the user to confirm whether the electronic file should be saved.

When the user has chosen to automatically save the electronic file (S1602: YES), the electronic file storing control section 1406 requests the electronic file from the execution server 120 (S1604). When receiving the electronic file of interest from the execution server 120, the electronic file storing control section 1406 automatically saves the electronic file into a predetermined folder (S1604) and notifies the virtual server of the termination of the execution of the file (S1608).

When the user has chosen to allow the user to confirm whether the electronic file should be saved in a case where the user has chosen not to automatically save the electronic file (S1602: NO, S1610: YES), the electronic file storing control section 1406 displays possible files to be saved for the user (S1612). When the user chooses to save the electronic file (S1614: YES), the steps after S1604 are performed. When the user chooses not to save the electronic file (S1614: NO), the operation is terminated without saving the electronic file. The operation is also terminated without saving the electronic file when the user does not choose to confirm with the user as to whether the electronic file is to be saved (S1610: NO).

As described above with reference to FIG. 4, the virtual server may be reconstructed. Accordingly, the electronic file saved on the virtual server in S1522 is preferably saved on the electronic file storing section 1402 on the regular basis or before the virtual server is reconstructed. In this case, the electronic file manipulating section 1404 may automatically obtain the electronic file from the saving region of the virtual server, or the virtual server may be configured to automatically transmit the electronic file.

In the present embodiment, for example, the electronic file is transmitted from the file sharing server 1212 to be stored on the client terminal 1401. However, the electronic file may become available as a result of a computer readable storage medium such as an USB memory and a DVD being inserted into the client terminal 1401. Even when such an electronic file is infected with a virus, the electronic file is executed not on the client terminal 1401 but on the execution server 120 and the client terminal 1401 can be thus prevented from being infected with the virus.

Figure 17:
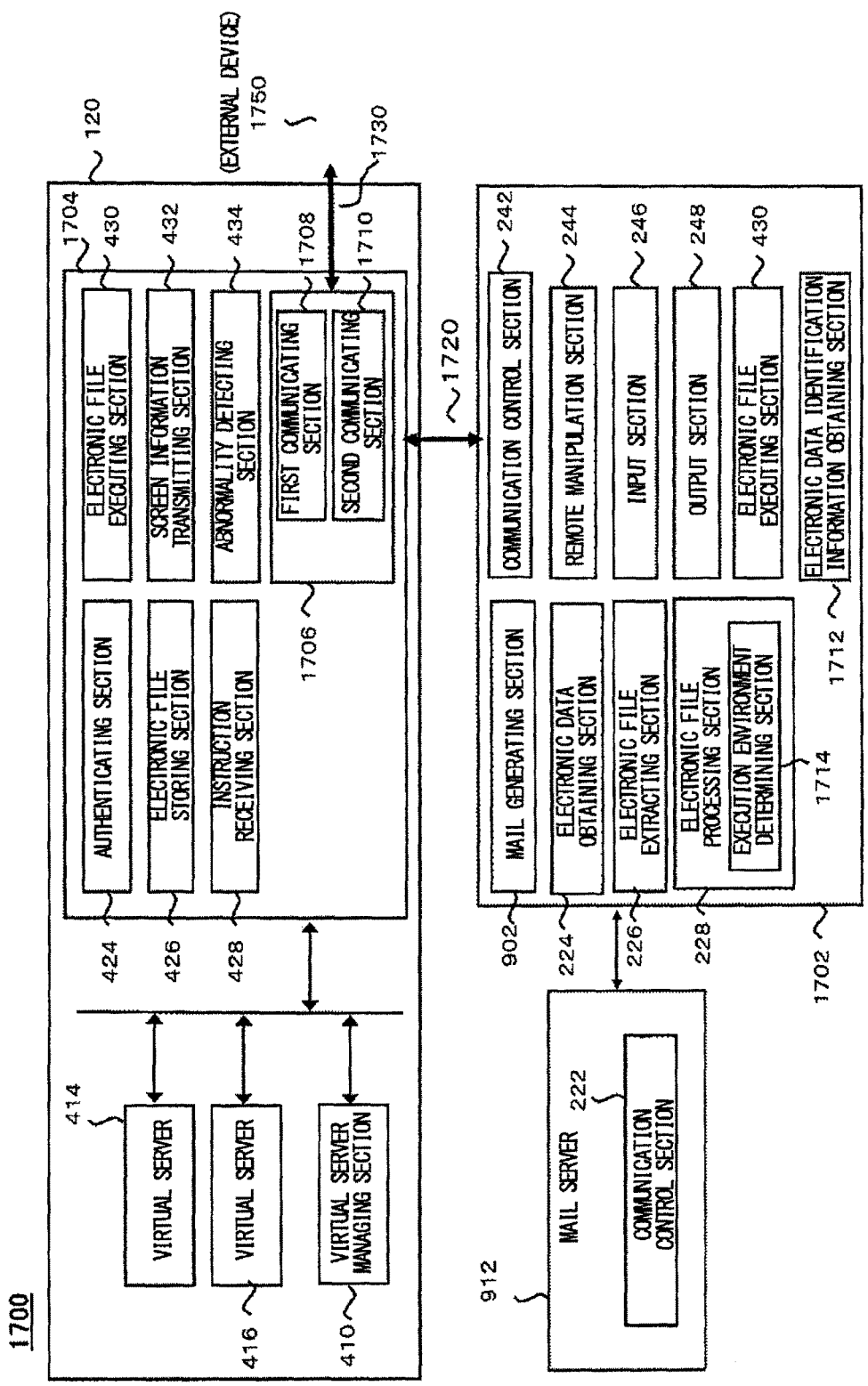
FIG. 17 schematically shows an example of a mail system 1700.

FIG. 17 schematically shows an example of a mail system 1700. The mail system 1700 includes the execution server 120, a mail server 912 and a client terminal 1702. In the present embodiment, the execution server 120 is different from the execution server 120 described with reference to FIG. 4 in that a virtual server 1704 generated on the execution server 120 includes a communication control section 1706 that includes a first communicating section 1708 and a second communicating section 1710. The execution server 120 may have the same structure as the execution server 120 described with reference to FIG. 4 except for the difference.

In the present embodiment, the client terminal 1702 is different from the client terminal 914 described with reference to FIG. 9 in that the client terminal 1702 has the electronic data identification information obtaining section 1712 and the electronic file processing section 228 has the execution environment determining section 1714. The client terminal 1702 may have the same structure as the client terminal 914 described with reference to FIG. 9 except for the difference. The execution environment determining section 1714 may be an exemplary remote manipulation program generating section.

In the present embodiment, the client terminal 1702 obtains electronic data identification information identifying electronic data. For example, when a user clicks an URL included in a electronic file such as an e-mail, an HTML file, a document file, a text file or a PDF file, the client terminal 1702 obtains the URL as electronic data identification information. The client terminal 1702 transmits the obtained electronic data identification information to an execution server, and allows electronic data identified by the electronic data identification information to be executed on the execution server 120. The execution server 120 obtains the electronic data via the communication path 1730.

The communication path 1730 may be a communication path that is different from the communication path 1720 between the client terminal 914 and the execution server 120. The communication path 1720 may be an exemplary first communication path. The communication path 1730 may be an exemplary second communication path.

In the present embodiment, the e-mail received by the client terminal 1702 includes electronic data identification information. The electronic data identification information obtaining section 1712 obtains the electronic data identification information identifying electronic data, in response to a user's instruction. Here, the electronic data identification information is designed to identify the location of the electronic data and/or to make it possible to access the electronic data.

The electronic data identification information may be any information that can identify electronic data and is not limited particularly. The electronic data identification information may be information that identifies electronic data directly such as an URI, an URL or an URN, and may be information that can identify electronic data indirectly.

In one embodiment, the electronic data identification information may be a file that has information regarding a location at which an electronic file is stored or information regarding a link destination, but does not have information regarding contents of the electronic file. Such as file can be, for example, a shortcut file. A shortcut file is provided with an extension ".link" for example.

When the link destination of a shortcut file is an electronic file stored on the execution server 120, for example if a user activates a shortcut file on the client terminal 1702, a communication path enabling remote manipulation is established between the client terminal 1702 and the execution server 120 by using a protocol such as the RDP. After this, the electronic file corresponding to the shortcut file is activated on the execution server 120.

The execution server 120 transmits image data of a display screen to be displayed on the output section 248 of the client terminal 1702 to the client terminal 1702. Also, when a user manipulates an OS, an application or a file on the execution server 120 via the input section 246 of the client terminal 1702, the execution server 120 transmits image data of a display screen corresponding to the manipulation by the user on the client terminal 1702.

In a different embodiment, the electronic data identification information may be a setting in which a client terminal and electronic data are associated by using any protocol. The protocol is not limited particularly, but existing protocols such as the FTP or Gopher, or protocols to be defined in the future may be used.

The electronic data of the present exemplary embodiment may include, in addition to the electronic file described with reference to FIGS. 1 to 16, electronic data that does not have a file format. Such electronic data can be, for example, a symbolic link, a junction, a hard link and the like.

The electronic file processing section 228 of the client terminal 1702 includes an execution environment determining section 1714. When the electronic data identification information obtaining section 1712 obtains the electronic data identification information, the execution environment determining section 1714 may determine an execution environment in which electronic data is to be executed. The execution environment determining section 1714 determines the execution environment for example based on identification information of the client terminal 1702, identification information of a user of the client terminal 1702, a protocol of an URI to be connected (HTTP, FTP, etc.), an URI to be connected, an IP address of a connection source, the version of an IP address of a connection source, electronic data identification information, information regarding the producer, receiver, file name, file format, extension, file size or the like of the attached file 340.

The execution environment may be the execution server 120 or the client terminal 1702. The execution environment may be at least one of one or more virtual servers constructed in the execution server 120, or may be at least one of one or more virtual servers constructed according to a command or a request from the client terminal 1702.

The execution environment determining section 1714 may generate a remote manipulation program for obtaining electronic data from an external device 1750 in which electronic data is placed. In one embodiment, the remote manipulation program may be a program to cause the remote manipulation section 244 of the client terminal 1702 to perform:

(a-1) a procedure of establishing the communication path 1720 enabling remote manipulation between the client terminal 1702 and an execution environment determined by the execution environment determining section 1714;

(b-1) a procedure of transmitting an instruction for causing the electronic file executing section 430 of the virtual server 1704 to activate a web browser;

(c-1) a procedure of transmitting, via the web browser, an instruction for causing the electronic file executing section 430 of the virtual server 1704 to obtain electronic data identified by an URL obtained by the electronic data identification information obtaining section 1712;

(d-1) a procedure of transmitting an instruction for causing the electronic file executing section 430 of the virtual server 1704 to execute the electronic data; and (e-1) a procedure of transmitting an instruction for causing the screen information transmitting section 432 of the virtual server 1704 to transmit, to the client terminal 1702, image data of a display screen for a case where the electronic data has been executed.

In a different embodiment, the execution environment determining section 1714 may generate a remote manipulation program for remotely manipulating an execution environment determined by the execution environment determining section 1714. The remote manipulation program may be a program to cause:

(b-2) a procedure of causing the electronic file executing section 430 of the virtual server 1704 to activate a web browser;

(c-2) a procedure of causing the electronic file executing section 430 of the virtual server 1704 to obtain, via the web browser, electronic data identified by an URL obtained by the electronic data identification information obtaining section 1712;

(d-2) a procedure of causing the electronic file executing section 430 of the virtual server 1704 to execute the electronic data; and (e-2) a procedure of causing the screen information transmitting section 432 of the virtual server 1704 to transmit, to the client terminal 1702, image data of a display screen for a case where the electronic data has been executed, to be executed. The electronic file executing section 430 and the screen information transmitting section 432 of the virtual server 1704 may be exemplary computers of the virtual server 1704.

Note that the external device 1750 is a different device from the execution server 120 in which the execution environment is placed to execute the electronic data. The external device 1750 may be realized as a physical device or may be realize as a virtual server.

When an execution environment obtains electronic data from the external device 1750, the execution environment needs not only to communicate with the client terminal 1702 but also to communicate with the external device 1750. In the present embodiment, the virtual server 1704 included in the execution server 120 includes the communication control section 1706 that includes the first communicating section 1708 and the second communicating section 1710.

In the present embodiment, the communication control section 1706 determines a TCP port or an UDP port to open a firewall. The communication control section 1706 may determine the TCP port or the UDP port to open a firewall based on identification information of the client terminal 114, identification information of a user of the client terminal 114, a protocol of an URI to be connected (HTTP, FTP, etc.), an URI to be connected, an IP address of a connection source, the version of an IP address of a connection source, information regarding the producer, receiver, file name, file format, extension, file size or the like of the attached file 340. In a different embodiment, the virtual server managing section 410 may determine at least one of the TCP port or the UDP port to open a firewall.

In the present embodiment, when having received an URI of electronic data and a request to instruct to obtain the electronic data identified by the URI, the communication control section 1706 receives the request if the request is a request from a predetermined application. On the other hand, if the request is not a request from a predetermined application, the request is not received.

The remote manipulation program may be a program for causing a procedure for establishing the communication path 1720 enabling remote manipulation between the client terminal 1702 and the execution environment included in the execution server 120 to be executed. In one embodiment, by the remote manipulation program being executed by the client terminal 1702, the communication path 1720 is established between the first communicating section 1708 and the client terminal 1702. The communication path 1720 may be a communication path based on a protocol for remote manipulation such as the RDP.

The remote manipulation program causes the execution server 120 to execute a procedure for establishing the communication path 1730 between the execution environment included in the execution server 120 and the external device 1750. The communication path 1730 may be a communication path enabling remote manipulation or a normal communication path based on a protocol such as HTTP and HTTPS.

For example, by the remote manipulation program being executed by the execution server 120, the second communication path 1730 is established between the second communicating section 1710 and the external device 1750. By the remote manipulation program being executed by the client terminal 1702, the second communication path 1730 may be established between the second communicating section 1710 and the external device 1750. For example, the communication path 1730 may be established by the client terminal 1702 transmitting, to the execution server 120, an instruction for establishing the communication path 1730 between the second communicating section 1710 and the external device 1750.

The execution environment determining section 1714 may generate a remote manipulation program for causing the execution server 120 to execute a procedure to obtain electronic data via the communication path 1730. The remote manipulation program may be a program to cause the execution server 120 to execute a procedure of processing the obtained electronic data in an execution environment, and a procedure of transmitting image data of a display screen to the client terminal 1702 via the communication path 1720.

For example, when the remote manipulation program is executed on the execution environment on the execution server 120, the electronic data identified by the URL can be executed on the execution environment and the result of the execution can be displayed on the screen of the client terminal 1702. In this way, even when the data identified by the URL is infected with a virus, the contents of the data can be safely viewed.

The execution environment determining section 1714 may obtain information regarding an execution environment when accessing data identified by electronic data identification information. The execution environment determining section 1714 may obtain information regarding an execution environment from a storage device of the execution server 120 or the client terminal 1702, or another storage device.

For example, the execution environment determining section 1714 obtains information regarding an execution environment when having obtained an URI, an URL, an URN or the like of electronic data, when having received, from a user, a command to access an URI, an URL, an URN or the like of electronic data, or when a user has executed a shortcut file of electronic data. When an operation corresponding to manipulation of an electronic file is to be executed on the execution server 120, the information regarding the execution environment can be, for example, information identifying a server to be the execution environment, an expiration limit of the server, a user ID of a user of the file transfer system 100 or the client terminal 114 in the server, a password associated with the user ID and the like.

The execution environment determining section 1714 may determine an execution environment based on at least one of predetermined white list and blacklist. At least one of the white list and the blacklist may be have been stored on the client terminal 1702, stored on the execution server 120, or stored on an external server that is not illustrated.

The white list may be a list of URIs that are allowed for access or a list of file formats or extensions that are allowed to be executed on the client terminal 1702. The blacklist may be a list of URIs that are banned for access, or a list of file formats or extensions that are banned to be executed on the client terminal 1702. When there is a corresponding item in both the white list and the blacklist, the execution environment determining section 1714 may determine whether to prioritize the white list or the blacklist based on a predetermined algorithm or a user's instruction.

The execution environment determining section 1714 may transmit, to the execution server 120, a command to instruct to read information stored on a storage device of the client terminal 1702 into cookies of a web browser installed on the virtual server 1704. The information stored on the storage device of the client terminal 1702 can be, for example, information stored in cookies of a web browser installed on the client terminal 1702, a user ID saved in the web browser, password information for each site such as a login password for a web site, setting information of various web sites, setting information of the web browser and the like.

In the present embodiment, details of the client terminal 1702 and the execution server 120 are described in an exemplary case where an e-mail received by the client terminal 1702 includes electronic data identification information. However, the client terminal 1702 and the execution server 120 are not limited to the present embodiment. Even when a web site viewed via a web browser installed on the client terminal 1702 includes electronic data identification information, the client terminal 1702 and the execution server 120 can process or manipulate electronic data identified by the electronic data identification information according to the same procedures as in the present embodiment.

In the present embodiment, the case where when the electronic data identification information obtaining section 1712 obtains the electronic data identification information, the execution environment determining section 1714 generates a remote manipulation program, the client terminal 1702 or the execution server 120 executes the remote manipulation program, and the processing of establishing a communication path, the processing of obtaining electronic data, and the processing of executing the electronic data are executed is described. However, the information processing in the mail system 1700 is not limited to the present embodiment.

In a different embodiment, the remote manipulation program may be installed on the client terminal 1702 in advance. For example, the electronic data identification information obtaining section 1712 obtains electronic data identification information. The execution environment determining section 1714 determines an execution environment in which electronic data identified by the electronic data identification information obtained by the electronic data identification information obtaining section 1712 is to be executed. Also, when the electronic data identification information obtaining section 1712 obtains electronic data identification information, the remote manipulation program is executed on the client terminal 1702, and for example the following processing is executed.

First, the communication control section 242 and the remote manipulation section 244 establish the communication path 1720 with an execution environment determined by the execution environment determining section 1714. After this, the remote manipulation section 244 transmits, to the instruction receiving section 428 of the virtual server 1704, an instruction for causing the electronic file executing section 430 of the virtual server 1704 to activate a web browser. Also, the remote manipulation section 244 transmits, to the instruction receiving section 428, an instruction for causing the electronic file executing section 430 of the virtual server 1704 to obtain and execute electronic data identified by the electronic data identification information.

The electronic file executing section 430 of the virtual server 1704 activates a web browser based on the instruction from the remote manipulation section 244, and establishes, via the second communicating section 1710, the communication path 1730 with the external device 1750 that has electronic data identified by the electronic data identification information stored thereon. Also, the electronic file executing section 430 of the virtual server 1704 obtains electronic data from the external device 1750 and executes the electronic data on the electronic file executing section 430 based on the instruction from the remote manipulation section 244. The screen information transmitting section 432 transmits, to the client terminal 1702 via the communication path 1720, image data of a display screen for a case where the electronic data has been executed.

Figure 18:
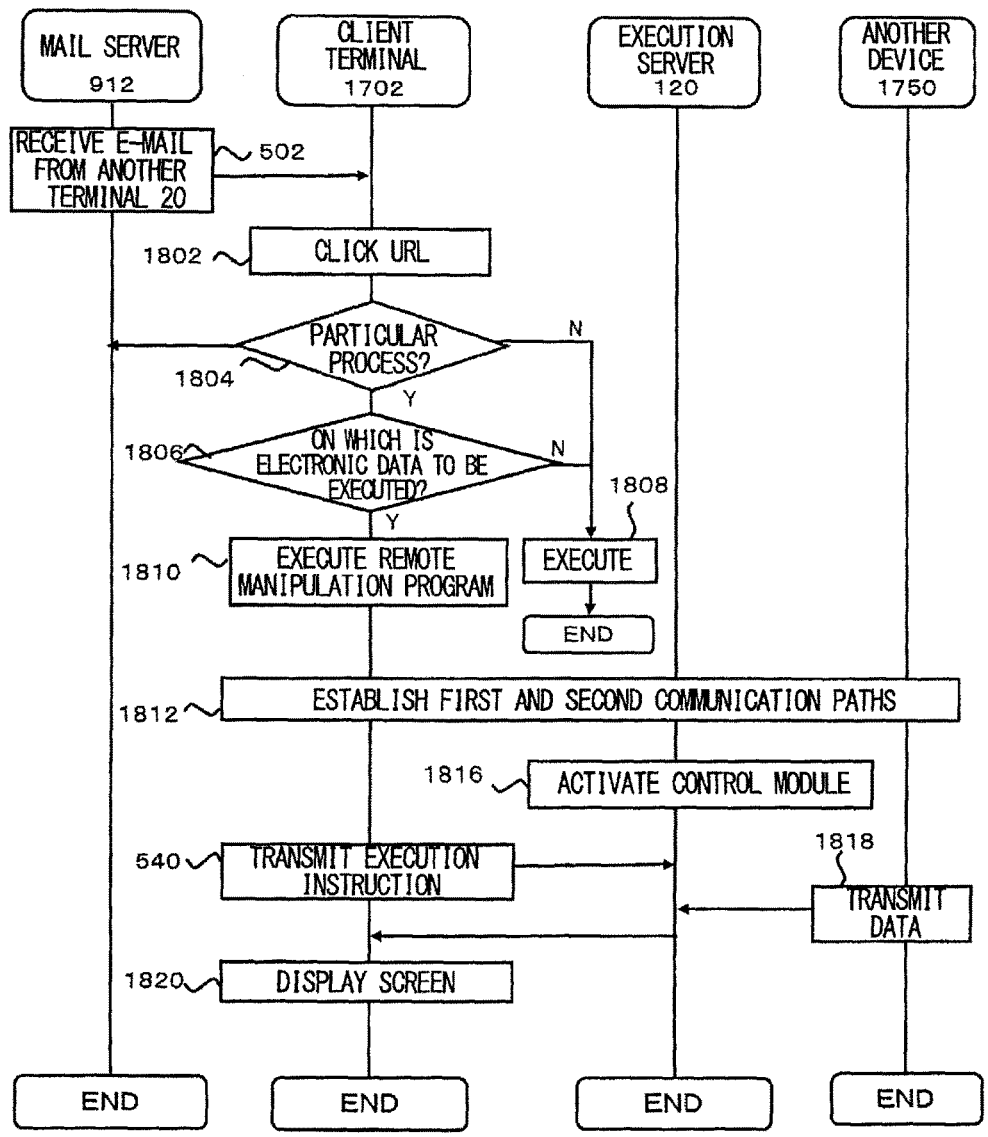
FIG. 18 schematically shows an exemplary process performed in the mail system 1700.

FIG. 18 schematically shows an exemplary operation performed in the mail system 1700. The steps assigned with the same reference numerals as in FIG. 10 may be the same as the corresponding steps shown in FIG. 10.

According to the present embodiment, in S502, the electronic data obtaining section 224 of the client terminal 1702 receives an e-mail from the other terminal 20. In S1802, the electronic data identification information obtaining section 1712 detects that the user has clicked the URL attached to the e-mail and then obtains the URL.

In S1804, the execution environment determining section 1714 confirms whether the electronic data identification information obtaining section 1712 obtains the electronic data identification information using a predetermined process. The predetermined process may mean, for example, that electronic data identification information is obtained when a user opens an e-mail by using a predetermined mailer such as Outlook, when a user clicks an URL in a predetermined electronic file such as a document file such as a Word or Excel file, a text file or a PDF file, or when a user clicks an URL while using a predetermined application such as a web browser.

When a process in which the electronic data identification information obtaining section 1712 obtains electronic data identification information is not a predetermined process (S1804: NO), the electronic file executing section 430 of the client terminal 1702 executes electronic data (S1808). Executing electronic data may mean opening a page identified by an URL obtained by the electronic data identification information obtaining section 1712 by using a web browser associated with the client terminal 1702.

When a process in which the electronic data identification information obtaining section 1712 obtains electronic data identification information is a predetermined process (S1804: YES), the execution environment determining section 1714 allows the user to check whether to cause electronic data identified by an URL obtained by the electronic data identification information obtaining section 1712 to be executed on the execution server 120 or the client terminal 1702 (S1806). Here, the execution environment determining section 1714 can allow the user to confirm whether the electronic data identified by the URL should be executed on the execution server 120 or on the client terminal 1702 by displaying for the user display means such as a dialog.

When execution on the client terminal 1702 is chosen (S1806: NO), the electronic file executing section 430 of the client terminal 1702 executes the electronic data (S1808). On the other hand, when execution on the execution server 120 is chosen (S1806: YES), a remote manipulation program is executed on the client terminal 1702 (S1810).

Upon execution of the remote manipulation program, the communication path 1720 and the communication path 1730 are established (S1812). To be specific, for example, the execution environment determining section 1714 of the client terminal 1702 connects with a virtual host server of the execution server 120 and obtains information regarding the virtual guest server to which the client terminal 1702 is to be connected. The virtual host server may be the virtual server managing section 410. The virtual guest server may be at least one of the virtual servers 412-416. The information regarding the virtual guest server to which the client terminal 1702 is to be connected may be exemplary information regarding the execution environment.

The execution server 120 determines a protocol such as the TCP or the UDP to be used by the execution server 120 based on the type of an electronic file, the extension of an electronic file, an URI, an URL, an URN or the like. The execution server 120 opens a particular port based on a protocol determined (may be referred to as "open a port"). After this, the client terminal 1401 identifies the particular port and connects to a virtual guest server by using a protocol such as the RDP.

According to one embodiment, the execution server 120 allows only TCP communication for the communication with the client terminal 1702, and open TCP (80, 53) and UPD (53) ports. As a result, the page identified by the URL can be processed using the web browser on the execution environment (for example, a web browser installed on the virtual server 1704 of the execution server 120). These ports may be exemplary first communicating section and second communicating section.

As triggered by the above-described connection using a protocol such as the RDP, the electronic file executing section 430 of the virtual server 1704 activates a control module to control the application used to execute the electronic data identified by the URL (S1816). The control module controls the application to execute electronic data. The application can be, for example, a web browser, a viewer, word processor application, a spreadsheet application, a presentation application and the like. The processing of opening a port may be executed by the control module.

According to one embodiment, upon activation of the control module on the virtual server 1704, the remote manipulation section 244 of the client terminal 1702 transmits, to the electronic file executing section 430 of the virtual server 1704 via the first communication path 1720, an URL obtained by the electronic data identification information obtaining section 1712 in S1802 (S540). The remote manipulation section 244 may identify the first communicating section 1708 and transmit the URL to the virtual server 1704. The URL may be an exemplary execution instruction.

Subsequently, the control module activates a web browser in the electronic file executing section 430 of the virtual server 1704. In this way, electronic data identified by the URL received from the client terminal 1702 is processed by the web browser. For example, the web browser requests the external device 1750 to transmit electronic data identified by the URL. The web browser exchanges information with the external device 1750 via the second communicating section 1710 and the communication path 1730. In response to the request from the web browser, the external device 1750 transmits electronic data identified by the URL to the web browser (S1818). The electronic data identified by the URL may be data of a web page described in the HTML.

The web browser of the virtual server 1704 receives the electronic data from the external device 1750 and executes the electronic data. The screen information transmitting section 432 transmits, to the client terminal 1702, image data of a display screen of the web browser by using a remote manipulation technology such as the RDP, and the display screen is displayed on the output section 248 of the client terminal 1702 (S1820).

Upon termination of processing or manipulation of electronic data, a user manipulates the client terminal 1702, and transmits, to the virtual server 1704, an instruction for terminating the web browser that is in operation on the virtual server 1704. When the instruction receiving section 428 of the virtual server 1704 receives the user's instruction, the communication control section 1706 closes a port that is open. The execution server 120 may close a port without receiving a user's instruction, but when termination of processing or manipulation of the electronic data is detected. For example, when having not been able to communicate with the client terminal 1702 or a network for a certain length of time, the execution server 120 detects termination of processing or manipulation of the electronic data. The control module may execute the processing of detecting termination of processing or manipulation of the electronic data, and the processing of closing a port.

In the above-described processing, part of the steps may be omitted, and the order of respective steps may be switched. For example, S1806 may be omitted. Also, in S1806, the execution environment determining section 1714 may allow a user to choose whether to display the dialog.

According to the present embodiment, in S1816, the control module is activated at the timing at which the connection is established using a protocol such as the RDP. However, the timing at which the control module is activated is not limited to the present embodiment. In a different embodiment, the control module may be activated when a virtual server is activated.

FIG. 18 shows an example where the electronic data identification information obtaining section 1712 obtains the electronic data identification information when the user clicks the URL attached to the electronic mail received from the other terminal 20. However, the electronic data identification information obtaining section 1712 is not limited to the present embodiment. The electronic data identification information obtaining section 1712 may obtain the electronic data identification information in various manners from the electronic data that is accessible by the client terminal 1702.

For example, the electronic data identification information obtaining section 1712 may obtain the electronic data identification information by allowing the client terminal 1702 to access the electronic data originally stored on the client terminal 1702 or the electronic data stored on a storage medium such as an USB memory and a DVD. The electronic data may be a document file such as a Word or Excel file, a text file or a PDF file.

As described above, to enable the user to view a web screen indicated by the URL, the execution environment (which is for example the virtual server) needs two communication ports to perform communication for both of the client terminal and the external device. Such a virtual server may or may not be included in the execution server 120 in advance. Furthermore, the virtual server may include only one communication port. Thus, when the execution environment determining section 1714 determines the virtual environment in which the electronic data is to be executed, the execution environment determining section 1714 may choose an execution environment that includes the external device 1750 and the second communication path from among a plurality of virtual servers included in the execution server 120, when receiving the electronic data identification information.

In one embodiment, the execution environment determining section 1714 may select a virtual environment including in advance both of the first communicating section 1708 and the second communicating section 1710, and then a remote manipulation program including a command for establishing the first and second communication paths may be executed. In a different embodiment, the execution environment determining section 1714 may select a virtual environment including only the first communicating section 1708 and perform remote manipulation to generate a port corresponding to the second communicating section 1710 for the selected virtual environment. In this case, the execution environment determining section 1714 generates a remote manipulation program including a command for establishing the communication path 1730 with the external device 1750 and can establish the communication path 1730 in response to execution of the remote manipulation program.

The present embodiment can be combined with other embodiments. For example, FIG. 14 describes the exemplary embodiment in which, when the user manipulates, for example, views the electronic file stored on the client terminal 1401, the electronic file is transferred from the client terminal 1401 to the execution server 120 to be manipulated on the virtual server. When the electronic file includes electronic data identification information such as a URL, however, the virtual server performs operations accompanying the manipulation, for example, viewing of the electronic file and can also perform operations to view the web screen identified by the URL as described above. Furthermore, the same applies to the case where an e-mail is received from the mail server 112 or 912 shown in FIGS. 1 to 10. When the e-mail includes an URL, similar operations to the above can be performed.

Note that the communication with the external device is not necessarily required in the embodiments shown in FIGS. 1 to 16. Rather, from the perspective of the security issues, the port to open the second communication path 1730 (the second communicating section 1710) is better omitted. Thus, the execution server 120 may generate, in advance, two types of virtual servers, in other words, a virtual server that is capable of communicating only with the client terminal and a virtual server that is capable of communicating with both of the client terminal and the external device.

The execution environment determining section 1714 may determine which of the execution environments (the virtual servers) is to be chosen at least based on one of the information obtained by the user's manipulation, the application used for the user's manipulation, and the user's manipulation itself. For example, when the URL is obtained by the user's manipulation, the execution environment determining section 1714 chooses the virtual server including communication ports that are capable of communicating respectively with the external device and the client terminal. When the information indicating that a Word file is to be viewed by the user's manipulation is obtained, the execution environment determining section 1714 may choose the virtual server including a communication port that is capable of communicating only with the client terminal 1702.

Alternatively or additionally, the execution environment determining section 1714 may determine which of the execution environments (the virtual servers) is to be chosen based on at least one of the fact that information unique to the user, for example, a login user name, is obtained, the fact that the extension of the electronic file is obtained, and the fact that an identifier to distinguish the application used to process the electronic file at the client terminal is obtained. Furthermore, the execution environment determining section 1714 may determine which of the execution environments is to be chosen based on the attributes of the electronic file such as the file size, the file name, and file format of the electronic file, the location at which the electronic file is saved, the date and time when the electronic file is saved or updated. In this case, the execution environment determining section 1714 may determine which of the execution environments is to be chosen when the electronic file to be manipulated by the user has a predetermined attribute or combination of attributes.

In a case where no virtual servers are generated in advance in the execution server 120, the execution environment determining section 1714 may generate a remote manipulation program to generate a virtual server including a communication port that is capable of communicating with each of the external device and the client terminal and generate a desired virtual server by causing the execution server 120 to execute the remote manipulation program when the electronic data identification information obtaining section 1712 obtains an URL. Likewise, when the information indicating that a Word file is to be viewed by the user is obtained, the execution environment determining section 1714 may generate a remote manipulation program to generate a virtual server including a communication port that is capable of communicating only with the client terminal and cause the execution server 120 to execute the remote manipulation program.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The specification of the present application describes about the following features. It is obvious for persons skilled in the art that various changes or improvement can be added to the following features.

[Item 1] An information processing apparatus comprising:
an electronic file extracting section that extracts an electronic file from electronic data;
an electronic file transmitting section that transmits the electronic file extracted by the electronic file extracting section or a file relating to the electronic file to an execution environment in which the electronic file is to be executed; and
a remote manipulation section that establishes a communication path enabling remote manipulation with the execution environment and transmits an execution instruction to instruct the execution environment to execute the electronic file thereon to the execution environment via the communication path enabling remote manipulation.

[Item 2] The information processing apparatus as set forth in Item 1, further comprising
a file converting section that generates the file relating to the electronic file by changing a format, an extension or a name of the electronic file extracted by the electronic file extracting section or encrypting the electronic file extracted by the electronic file extracting section.

[Item 3] An information processing apparatus comprising:
an electronic file extracting section that extracts an electronic file from electronic data;
an execution environment determining section that determines an execution environment in which the electronic file is to be executed by remote manipulation; and
a remote manipulation program generating section that generates a remote manipulation program to remotely manipulate the execution environment determined by the execution environment determining section, wherein
the remote manipulation program causes a computer to perform a procedure for establishing a communication path enabling remote manipulation between the computer and the execution environment determined by the execution environment determining section.

[Item 4] The information processing apparatus as set forth in Item 3, wherein
the remote manipulation program causes the computer to further perform a procedure for transmitting an execution instruction to instruct the execution environment to execute the electronic file thereon to the execution environment via the communication path enabling remote manipulation.

[Item 5] The information processing apparatus as set forth in Item 3 or 4, wherein
the remote manipulation program causes the computer to further perform a procedure for transmitting the electronic file or a file relating to the electronic file via a communication line from the computer to the execution environment.

[Item 6] The information processing apparatus as set forth in Item 3 or 4, further comprising
an electronic file transmitting section that transmits the electronic file or a file relating to the electronic file via a communication line to the execution environment.

[Item 7] The information processing apparatus as set forth in any one of Items 3 to 6, further comprising a file converting section that generates the file relating to the electronic file by changing a format, an extension or a name of the electronic file extracted by the electronic file extracting section or encrypting the electronic file extracted by the electronic file extracting section.

[Item 8] The information processing apparatus as set forth I any one of Items 1 to 7, further comprising the execution environment.

[Item 9] The information processing apparatus as set forth in Item 8, wherein the execution environment is constructed on a virtual server, and the virtual server includes:

an instruction receiving section that receives an instruction from a user via a communication line;

an electronic file executing section that executes the electronic file or the file relating to the electronic file that has been transmitted to the execution environment, based on the instruction from the user; and a screen information transmitting section that transmits via the communication line screen information to be displayed for the user.

[Item 10] The information processing apparatus as set forth in Item 9, wherein the virtual server further includes an abnormality detecting section that detects abnormality of the execution environment.

[Item 11] The information processing apparatus as set forth in Item 10, wherein the abnormality detecting section detects abnormality of the execution environment when the execution environment performs an operation other than an operation corresponding to the instruction from the user.

[Item 12] The information processing apparatus as set forth in any one of Items 9 to 11, wherein the virtual server further includes a communication control section that controls communication with an external entity.

[Item 13] An information processing apparatus comprising a virtual server that executes an electronic file by remote manipulation from a client terminal, wherein the virtual server includes an instruction receiving section that receives an instruction from a user via the client terminal and a communication line;

an electronic file executing section that executes the electronic file based on the instruction from the user;

a screen information transmitting section that transmits screen information to be displayed for the user, to the client terminal via the communication line; and an abnormality detecting section that detects abnormality of the virtual server, wherein the abnormality detecting section detects abnormality of the virtual server when the virtual server performs an operation other than an operation corresponding to the user's instruction.

[Item 14] The information processing apparatus as set forth in Item 13, wherein the virtual server further includes a communication control section that controls communication with an external entity.

[Item 15] A program to cause a computer to function as the information processing apparatus as set forth in any one of Items 1 to 14.

[Item 16] An information processing method comprising:

an electronic file extracting step of extracting an electronic file from electronic data;

an electronic file transmitting step of transmitting the electronic file extracted in the electronic file extracting step or a file relating to the electronic file to an execution environment in which the electronic file is to be executed; and a remote manipulation step of establishing a communication path enabling remote manipulation with the execution environment and transmits an execution instruction to instruct the execution environment to execute the electronic file thereon to the execution environment via the communication path enabling remote manipulation.

[Item 17] An information processing method comprising:

an electronic file extracting step of extracting an electronic file from electronic data;

an execution environment determining step of determining an execution environment in which the electronic file is to be executed by remote manipulation; and a remote manipulation program generating step of generating a remote manipulation program to remotely manipulate the execution environment determined in the execution environment determining step, wherein the remote manipulation program causes a computer to perform a procedure for establishing a communication path enabling remote manipulation between the computer and the execution environment determined in the execution environment determining step.

[Item 18] A data structure stored on a first computer including a storage device, the data structure comprising:

data of an electronic file;

destination identification data identifying a destination of the electronic file;

execution environment identification data identifying a second computer to execute the electronic file; and a program to cause the first computer to perform a procedure for transmitting the data of the electronic file to the destination identified by the destination identifying data and a procedure for establishing a communication path enabling remote manipulation between the first computer and the second computer identified by the execution environment identification data.

DESCRIPTION OF REFERENCE NUMERALS 10 network, 20 terminal, 22 client terminal, 24 client terminal, 100 file transfer system, 110 mail system, 112 mail server, 114 client terminal, 120 execution server, 222 communication control section, 224 electronic data obtaining section, 226 electronic file extracting section, 228 electronic file processing section, 242 communication control section, 244 remote manipulation section, 246 input section, 248 output section, 312 execution environment determining section, 314 electronic file transmitting section, 316 notification data generating section, 318 notification data transmitting section, 330 notification data, 332 header information, 334 e-mail text, 336 URI, 340 attached file, 410 virtual server managing section, 412 virtual server, 414 virtual server, 416 virtual server, 422 communication control section, 424 authenticating section, 426 electronic file storing section, 428 instruction receiving section, 430 electronic file executing section, 432 screen information transmitting section, 434 abnormality detecting section, 728 electronic file processing section, 730 notification data, 736 remote manipulation program, 902 mail generating section, 910 mail system, 912 mail server, 914 client terminal, 1200 file transfer system, 1212 file sharing server, 1400 file processing system, 1401 client terminal, 1402 electronic file storing section, 1404 electronic file manipulating section, 1406 electronic file storing control section, 1408 execution environment determining section, 1700 mail system, 1702 client terminal, 1704 virtual server, 1706 communication control section, 1708 first communicating section, 1710 second communicating section, 1712 electronic data identification information obtaining section, 1714 execution environment determining section, 1720 communication path, 1730 communication path, 1750 external device

What is claimed is:

1. An information processing apparatus comprising:
   an electronic data identifying information obtaining section configured to obtain electronic data identifying information for identifying electronic data;
   an execution environment determiner configured to determine an execution environment in which the electronic data is to be executed; and
   a remote manipulation program generator configured to generate a remote manipulation program for remote-manipulating the execution environment determined by the execution environment determiner; wherein
   the remote manipulation program causes a first computer to execute establishing a first communication path enabling remote manipulation with the execution environment determined by the execution environment determiner;
   the execution environment comprises a second communication path with a second computer different from the first computer,
   the execution environment is established on a virtual server, and
   (i) when the electronic data identifying information obtaining section obtains the electronic data identifying information by a first process,
      the execution environment determiner determines executing the electronic data in the execution environment, and
      the remote manipulation program generator generates the remote manipulation program for causing the first computer to establish the second communication path between the second computer and the execution environment, and
   (ii) when the electronic data identifying information obtaining section obtains the electronic data identifying information by a second process different form the first process,
      the execution environment determiner determines executing the electronic data in the information processing apparatus.

2. The apparatus of claim 1, further comprising the execution environment, wherein
   (i) at least one of the electronic data identifying information obtaining section, the execution environment determiner and the remote manipulation program generator, and (ii) the execution environment are established on a single physical server or a physical machine, and
   the virtual server is established on the physical server or the physical machine.

3. The apparatus of claim 1, further comprising a virtual server manager configured to mange the virtual server, wherein
   when a first event occurs, the virtual server manager reestablishes the virtual server.

4. An information processing apparatus comprising:
   an electronic data identifying information obtaining section configured to obtain electronic data identifying information for identifying electronic data;
   an execution environment determiner configured to determine an execution environment in which the electronic data is to be executed; and
   a remote manipulation program generator configured to generate a remote manipulation program for remote-manipulating the execution environment determined by the execution environment determiner; wherein
   the remote manipulation program causes a first computer to execute establishing a first communication path enabling remote manipulation with the execution environment determined by the execution environment determiner;
   the execution environment comprises a second communication path with a second computer different from the first computer,
   the execution environment is established on a virtual server, and
   the remote manipulation program further causes the first computer to execute transmitting a first instruction, a second instruction and first information via the first communication path to the execution environment, wherein
   (a) the first instruction is an instruction to the execution environment for
      (i) activating a Web browser installed in the execution environment,
      (ii) through the Web browser, obtaining, via the second communication path, the electronic data identified by the electronic data identifying information, and
      (iii) processing the obtained electronic data in the execution environment,
   (b) the first information is one of
      (i) information stored in a cookie of the Web browser installed in the information processing apparatus,
      (ii) setting information of the Web browser, and
      (iii) security information or setting information of each Website saved in the Web browser, and
   (c) the second instruction is an instruction to make the Web browser to read one of
      (i) information stored in a cookie of the Web browser,
      (ii) setting information of the Web browser, and
      (iii) security information or setting information of each Website saved in the Web browser.

5. The apparatus of claim 4, further comprising the execution environment, wherein
   (i) at least one of the electronic data identifying information obtaining section, the execution environment determiner and the remote manipulation program generator, and (ii) the execution environment are established on a single physical server or a physical machine, and
   the virtual server is established on the physical server or the physical machine.

6. The apparatus of claim 4, further comprising a virtual server manager configured to mange the virtual server, wherein
   when a first event occurs, the virtual server manager reestablishes the virtual server.

* * * * *